(12) United States Patent
Kim et al.

(10) Patent No.: US 12,016,059 B2
(45) Date of Patent: Jun. 18, 2024

(54) EARLY DATA TRANSMISSION IN CU-DU SPLIT

(71) Applicant: LG ELECTRONICS INC., Seoul (KR)

(72) Inventors: Seokjung Kim, Seoul (KR); Jian Xu, Seoul (KR); Daewook Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 387 days.

(21) Appl. No.: 17/310,029

(22) PCT Filed: Dec. 31, 2019

(86) PCT No.: PCT/KR2019/018777
§ 371 (c)(1),
(2) Date: Jul. 12, 2021

(87) PCT Pub. No.: WO2020/166817
PCT Pub. Date: Aug. 20, 2020

(65) Prior Publication Data
US 2022/0132600 A1 Apr. 28, 2022

(30) Foreign Application Priority Data
Feb. 12, 2019 (KR) .......... 10-2019-0016329

(51) Int. Cl.
*H04W 76/10* (2018.01)
*H04W 76/30* (2018.01)
*H04W 88/08* (2009.01)

(52) U.S. Cl.
CPC ........... *H04W 76/10* (2018.02); *H04W 76/30* (2018.02); *H04W 88/085* (2013.01)

(58) Field of Classification Search
CPC ..... H04W 76/10; H04W 76/27; H04W 76/30; H04W 88/085
See application file for complete search history.

(56) References Cited

U.S. PATENT DOCUMENTS

| | | | | |
|---|---|---|---|---|
| 2019/0313244 A1* | 10/2019 | Wang | ....................... | H04W 8/24 |
| 2020/0106663 A1* | 4/2020 | Yoo | .......................... | H04L 67/10 |
| 2020/0113008 A1* | 4/2020 | Luo | ......................... | H04W 72/04 |
| 2020/0120572 A1* | 4/2020 | Fiorani | ................. | H04W 36/06 |

(Continued)

OTHER PUBLICATIONS

PCT International Application No. PCT/KR2019/018777, International Search Report dated Apr. 6, 2020, 1 pages.

(Continued)

*Primary Examiner* — Kan Yuen
(74) *Attorney, Agent, or Firm* — LEE, HONG, DEGERMAN, KANG & WAIMEY

(57) ABSTRACT

Provided are a method for early data transmission. According to an embodiment of the present disclosure, the method includes transmitting a radio resource control (RRC) connection resume request message to a control plane (CP) of central unit (CU) of the network node, receiving information informing that downlink (DL) data exists from the CP, receiving DL data from a user plane (UP) of the CU, transmitting the DL data to a wireless device in response to the information, upon receiving the DL data, and releasing transmission resources after transmitting the DL data.

13 Claims, 17 Drawing Sheets

(56) References Cited

U.S. PATENT DOCUMENTS

| | | | | |
|---|---|---|---|---|
| 2020/0229049 A1* | 7/2020 | Wu | ................... | H04W 88/085 |
| 2020/0344719 A1* | 10/2020 | Luo | ................... | H04W 68/005 |
| 2020/0383035 A1* | 12/2020 | Ma | ................... | H04W 76/16 |
| 2021/0144594 A1* | 5/2021 | Liu | ................... | H04W 36/385 |
| 2021/0211926 A1* | 7/2021 | Han | ................ | H04W 28/0268 |

OTHER PUBLICATIONS

Ericsson, "Corrections to Inactive to Other State procedures over F1," R3-180424, 3GPP TSG RAN WG3 NR AdHoc 1801, Jan. 2018, 8 pages.

LG Electronics Inc., "(TP for CPUP_Split BL CR for TS 38.401): Issues on RRC-INACTIVE state in CU-DU split," R3-183064, 3GPP TSG-RAN WG3 Meeting #100, May 2018, 9 pages.

Ericsson, "F1 interface functions," Tdoc R3-171724, 3GPP TSG-RAN WG3 #95bis, Apr. 2017, 7 pages.

Ericsson, "Bearer Setup and Security Considerations for Early Data in MTC," R2-1708630, 3GPP TSG-RAN WG2 #99, Aug. 2017, 7 pages.

Nokia et al., "TP of Resolution of open issues on F1 interface functions," R3-171454, 3GPP TSG-RAN WG3 Meeting #96, May 2017, 5 pages.

* cited by examiner

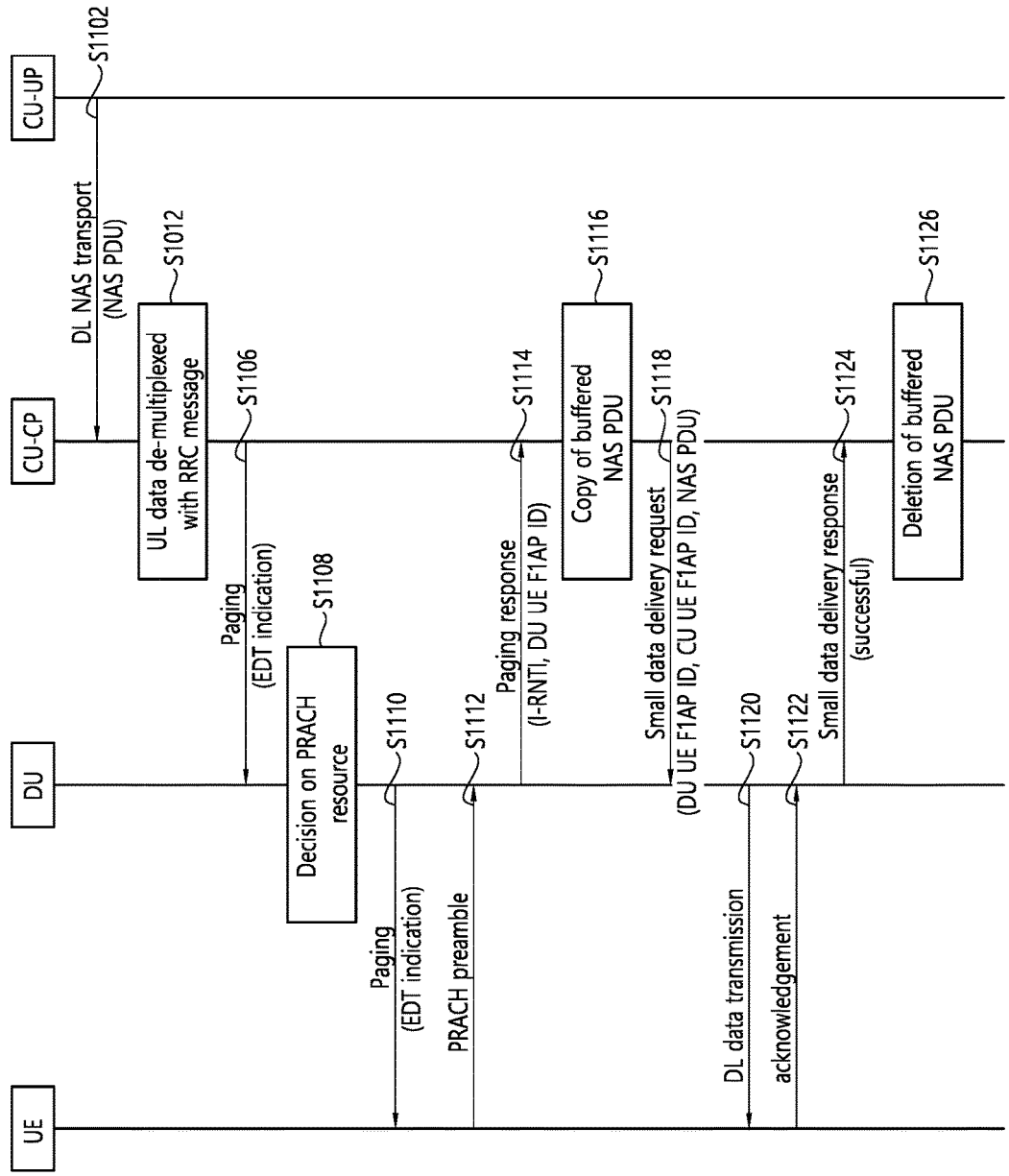

EARLY DATA TRANSMISSION IN CU-DU SPLIT

CROSS-REFERENCE TO RELATED APPLICATIONS

This application is the National Stage filing under 35 U.S.C. 371 of International Application No. PCT/KR2019/018777, filed on Dec. 31, 2019, which claims the benefit of earlier filing date and right of priority to Korean Application No. 10-2019-0016329, filed on Feb. 12, 2019, the contents of which is hereby incorporated by reference herein in its entirety.

TECHNICAL FIELD

The present disclosure relates to early data transmission.

BACKGROUND

Efforts have been made to develop an improved 5th-generation (5G) communication system or a pre-5G communication system in order to satisfy a growing demand on radio data traffic after commercialization of a 4th-generation (4G) communication system. A standardization act for a 5G mobile communication standard work has been formally started in 3GPP, and there is ongoing discussion in a standardization working group under a tentative name of a new radio access (NR).

Meanwhile, an upper layer protocol defines a protocol state to consistently manage an operational state of a user equipment (UE), and indicates a function and procedure of the UE in detail. In the discussion on the NR standardization, an RRC state is discussed such that an RRC_CONNECTED state and an RRC_IDLE state are basically defined, and an RRC_INACTIVE state is additionally introduced.

With the introduction of the new RRC state (i.e., RRC-INACTIVE state) in NR, the UE may incur minimum signaling, minimize power consumption, minimize resource costs in the network. In order to support this concept in NR, the UE may also be able to transmit the data without state transition from the RRC-INACTIVE to the RRC-CONNECTED. Early data transmission (EDT) refers to the operation of transmitting data before the RRC connection setup is completed, if the size of the data to be transmitted is small. In other words, according to the EDT, data transmission is allowed even when the UE is not in the RRC connection state.

SUMMARY

According to the prior art, CU and DU are not separated, so signals between the CU and DU are not necessary. However, in CU-DU split circumstances, additional signals are required to share information stored CU and DU, respectively.

However, the additional signals may lead to latency of procedures. Therefore, it needs to minimize the additional signals in the CU-DU split circumstances.

According to an embodiment of the present disclosure, a method performed by a wireless device in a wireless communication system is provided. The method may comprise transmitting a radio resource control (RRC) connection resume request message to a control plane (CP) of central unit (CU) of the network node, receiving information informing that downlink (DL) data exists from the CP, receiving DL data from a user plane (UP) of the CU, transmitting the DL data to a wireless device in response to the information, upon receiving the DL data, and releasing transmission resources after transmitting the DL data.

The present disclosure can have various advantageous effects.

For example, unnecessary signals between DU and CU during the EDT may be removed. In specific, the CU-CP may efficiently control whether the DU forwards the RRC message to the UE immediately, and whether the bearer context in the CU-UP should be fully resumed or not. Therefore, the performance of the UE may be better since the loss of DL data can be avoided and the unnecessary latency due to the data retransmission can be reduced.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

BRIEF DESCRIPTION OF THE DRAWINGS

FIG. 11 shows a method for performing EDT according to an embodiment of the present disclosure.

DETAILED DESCRIPTION

Figure 1:
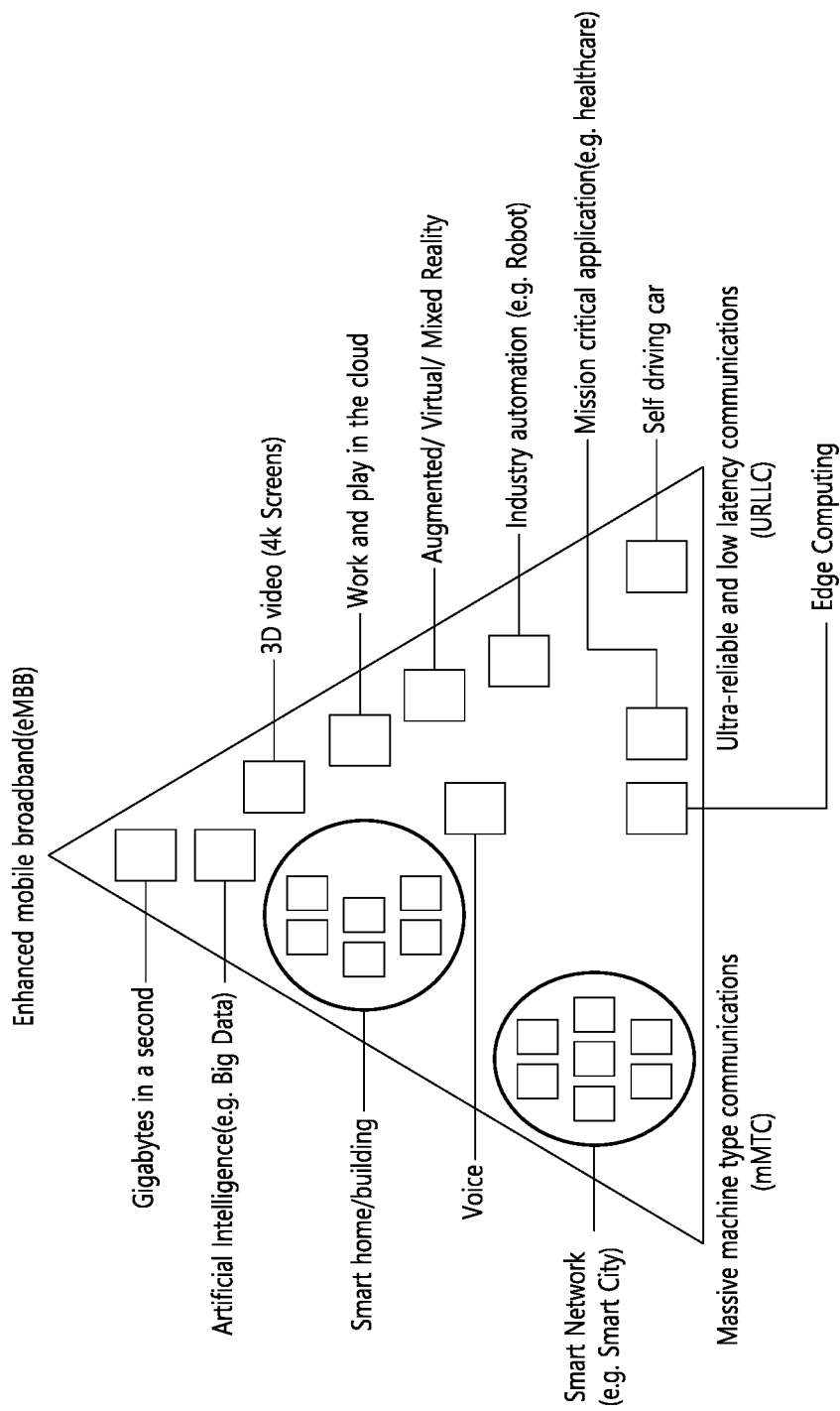
FIG. 1 shows examples of 5G usage scenarios to which the technical features of the present disclosure can be applied.

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In this document, the term "/" and "," should be interpreted to indicate "and/or." For instance, the expression "A/B" may mean "A and/or B." Further, "A, B" may mean "A and/or B." Further, "AB/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Figure 2:
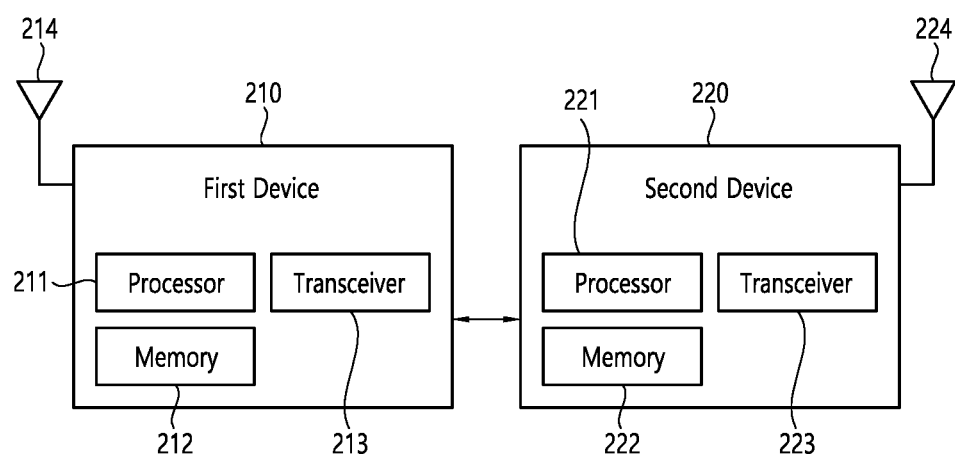
FIG. 2 shows an example of a wireless communication system to which the technical features of the present disclosure can be applied.

FIG. 2 shows an example of a wireless communication system to which the technical features of the present disclosure can be applied.

Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the present disclosure described below. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the present disclosure described below. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled to transmit and receive wireless signals.

The memory 212, 222 may be connected internally or externally to the processor 211, 212, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
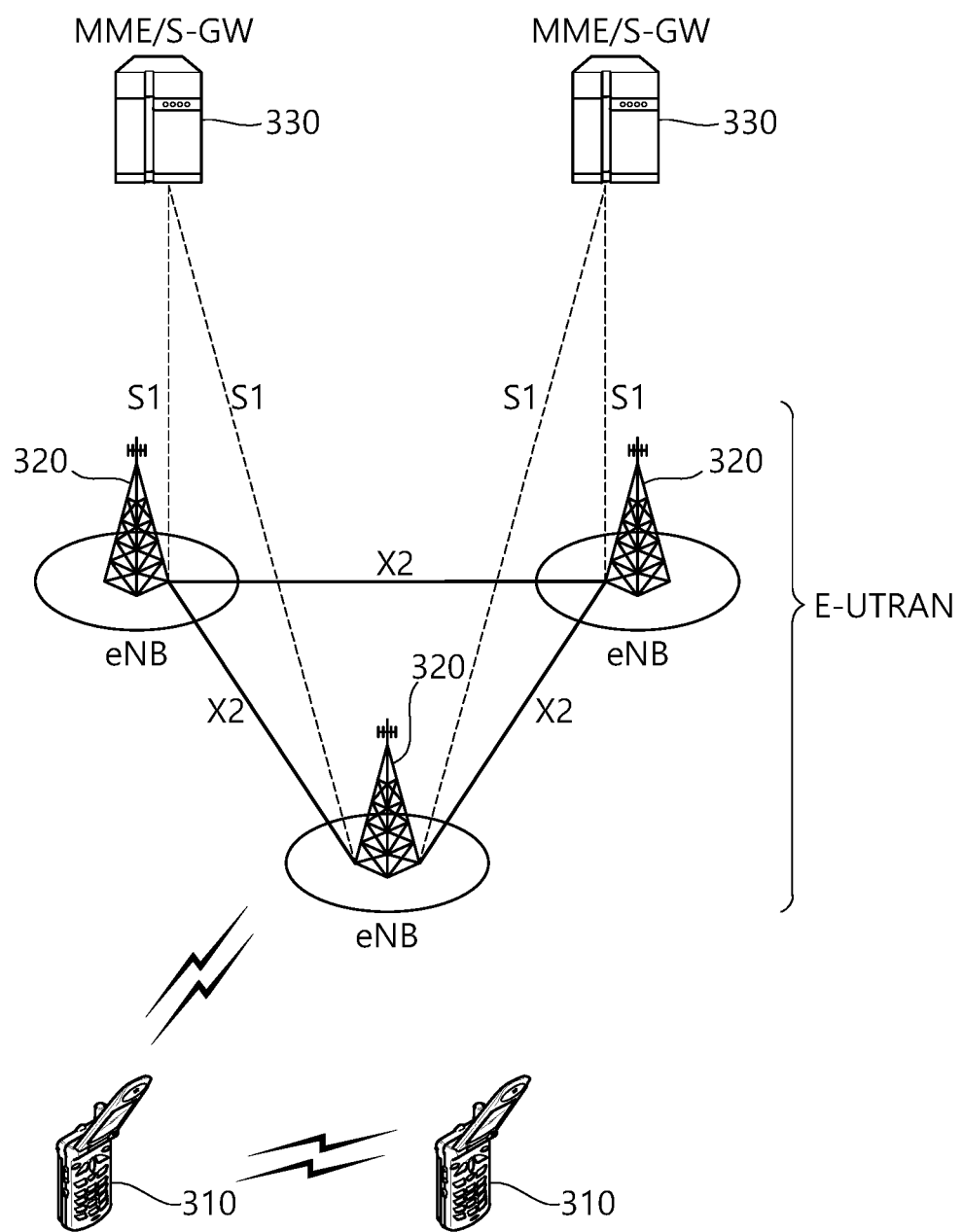
FIG. 3 shows an example of a wireless communication system to which the technical features of the present disclosure can be applied.

FIG. 3 shows an example of a wireless communication system to which the technical features of the present disclosure can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
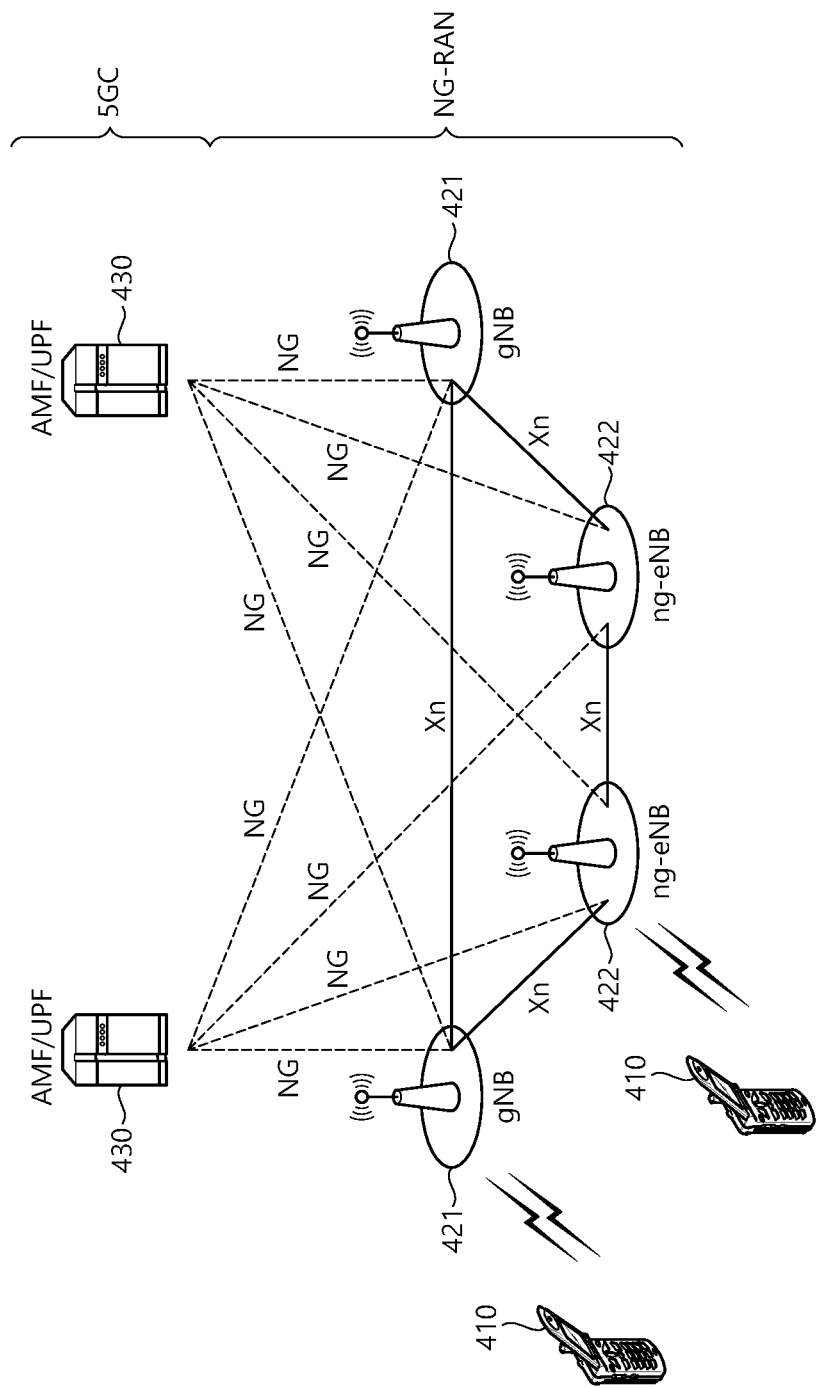
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
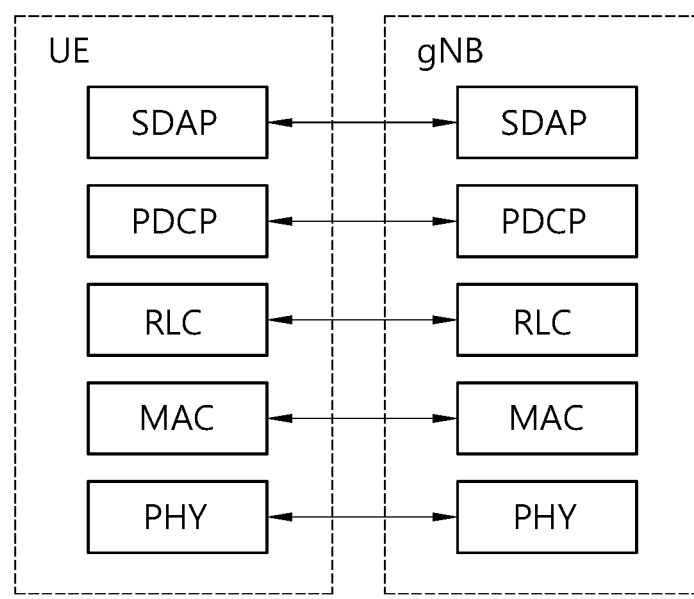
FIG. 5 shows a block diagram of a user plane protocol stack to which the technical features of the present disclosure can be applied.
Figure 6:
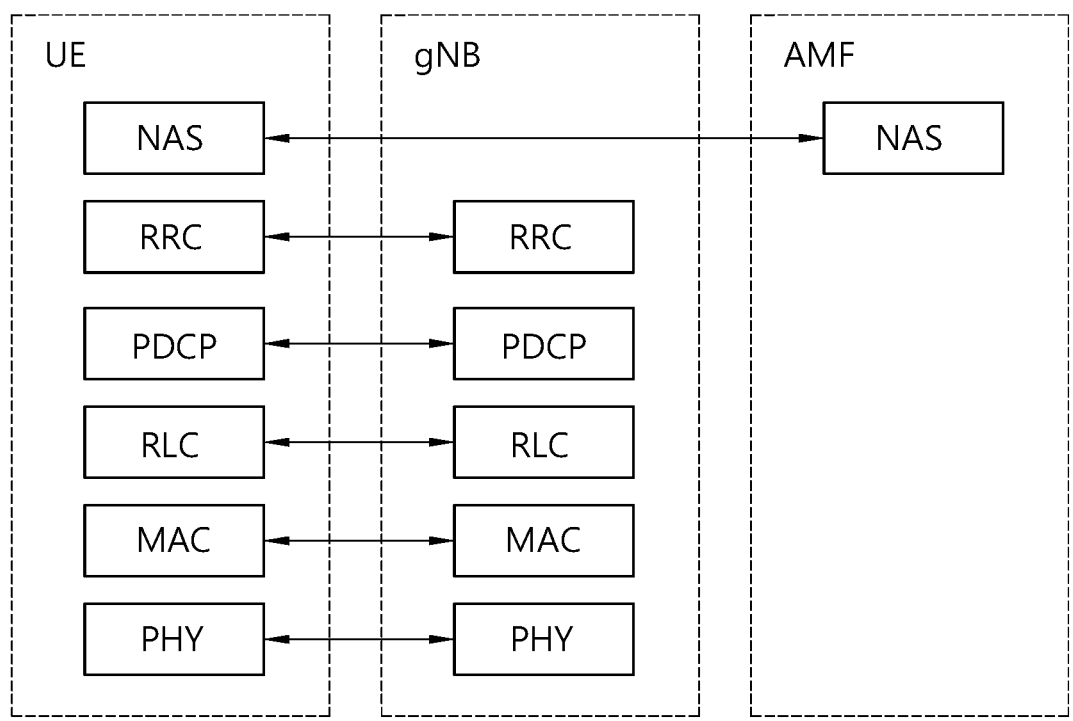
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARD), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Hereinafter, random access procedure is described.

The Random Access procedure is initiated by a PDCCH order, by the MAC sublayer itself or by the RRC sublayer. Random Access procedure on a SCell shall only be initiated by a PDCCH order. If a MAC entity receives a PDCCH transmission consistent with a PDCCH order masked with its C-RNTI, and for a specific Serving Cell, the MAC entity shall initiate a Random Access procedure on this Serving Cell. For Random Access on the SpCell a PDCCH order or RRC optionally indicate the ra-PreambleIndex and the ra-PRACH-MaskIndex, except for NB-IoT where the subcarrier index is indicated; and for Random Access on an SCell, the PDCCH order indicates the ra-PreambleIndex with a value different from 000000 and the ra-PRACH-MaskIndex. For the pTAG preamble transmission on PRACH and reception of a PDCCH order are only supported for SpCell. If the UE is an NB-IoT UE, the Random Access procedure is performed on the anchor carrier or one of the non-anchor carriers for which PRACH resource has been configured in system information.

Before the procedure can be initiated, the following information for related Serving Cell is assumed to be available for UEs other than NB-IoT UEs, BL UEs or UEs in enhanced coverage, unless explicitly stated otherwise:

- the available set of PRACH resources for the transmission of the Random Access Preamble, prach-ConfigIndex.
- the groups of Random Access Preambles and the set of available Random Access Preambles in each group (SpCell only):

The preambles that are contained in Random Access Preambles group A and Random Access Preambles group B are calculated from the parameters numberOfRA-Preambles and sizeOfRA-PreamblesGroupA:

If sizeOfRA-PreamblesGroupA is equal to numberOfRA-Preambles then there is no Random Access Preambles group B. The preambles in Random Access Preamble group A are the preambles 0 to sizeOfRA-PreamblesGroupA−1 and, if it exists, the preambles in Random Access Preamble group B are the preambles sizeOfRA-PreamblesGroupA to numberOfRA-Preambles−1 from the set of 64 preambles.

- if Random Access Preambles group B exists, the thresholds, messagePowerOffsetGroupB and messageSizeGroupA, the configured UE transmitted power of the Serving Cell performing the Random Access Procedure, PCMAX, c, and the offset between the preamble and Msg3, deltaPreambleMsg3, that are required for selecting one of the two groups of Random Access Preambles (SpCell only).
- the RA response window size ra-ResponseWindowSize.
- the power-ramping factor powerRampingStep.
- the maximum number of preamble transmission preambleTransMax.
- the initial preamble power preambleInitialReceivedTargetPower.
- the preamble format based offset DELTA PREAMBLE.
- the maximum number of Msg3 HARQ transmissions maxHARQ-Msg3Tx (SpCell only).

the Contention Resolution Timer mac-ContentionResolutionTimer (SpCell only).

The above parameters may be updated from upper layers before each Random Access procedure is initiated.

The following information for related Serving Cell is assumed to be available before the procedure can be initiated for NB-IoT UEs, BL UEs or UEs in enhanced coverage:

if the UE is a BL UE or a UE in enhanced coverage:
the available set of PRACH resources associated with each enhanced coverage level supported in the Serving Cell for the transmission of the Random Access Preamble, prach-ConfigIndex.
for EDT, the available set of PRACH resources associated with EDT for each enhanced coverage level supported in the Serving Cell for the transmission of the Random Access Preamble, prach-ConfigIndex.
the groups of Random Access Preambles and the set of available Random Access Preambles in each group (SpCell only):
If sizeOfRA-PreamblesGroupA is not equal to numberOfRA-Preambles:
Random Access Preambles group A and B exist and are calculated as above;
else:
the preambles that are contained in Random Access Preamble groups for each enhanced coverage level, if it exists, are the preambles firstPreamble to lastPreamble.
When a PRACH resource is shared for multiple enhanced coverage levels, and enhanced coverage levels are differentiated by different preamble indices, Group A and Group B is not used for this PRACH resource.

if the UE is an NB-IoT UE:
the available set of PRACH resources supported in the Serving Cell on the anchor carrier, nprach-ParametersList, and on the non-anchor carriers, in ul-ConfigList.
for EDT, the available set of PRACH resources associated with EDT on anchor carrier, nprach-ParametersList-EDT, and on the non-anchor carriers, in ul-ConfigList.
for random access resource selection and preamble transmission:
a PRACH resource is mapped into an enhanced coverage level.
each PRACH resource contains a set of nprach-NumSubcarriers subcarriers which can be partitioned into one or two groups for single/multi-tone Msg3 transmission by nprach-SubcarrierMSG3-RangeStart and nprach-NumCBRA-StartSubcarriers. Each group is referred to as a Random Access Preamble group below in the procedure text.
a subcarrier is identified by the subcarrier index in the range:
[nprach-SubcarrierOffset, nprach-SubcarrierOffset +nprach-NumSubcarriers -1]
each subcarrier of a Random Access Preamble group corresponds to a Random Access Preamble.
when the subcarrier index is explicitly sent from the eNB as part of a PDCCH order ra-PreambleIndex shall be set to the signalled subcarrier index.
the mapping of the PRACH resources into enhanced coverage levels is determined according to the following:
the number of enhanced coverage levels is equal to one plus the number of RSRP thresholds present in rsrp-ThresholdsPrachInfoList.
each enhanced coverage level has one anchor carrier PRACH resource present in nprach-ParametersList and zero or one PRACH resource for each non-anchor carrier signalled in ul-ConfigList.
for EDT, each enhanced coverage level has zero or one anchor carrier PRACH resource present in nprach-ParametersList-EDT and zero or one PRACH resource for each non-anchor carrier signalled in ul-ConfigList.
enhanced coverage levels are numbered from 0 and the mapping of PRACH resources to enhanced coverage levels are done in increasing numRepetitionsPerPreambleAttempt order.
when multiple carriers provide PRACH resources for the same enhanced coverage level, the UE will randomly select one of them using the following selection probabilities:
the selection probability of the anchor carrier PRACH resource for the given enhanced coverage level, nprach-ProbabilityAnchor, is given by the corresponding entry in nprach-ProbabilityAnchorList
the selection probability is equal for all non-anchor carrier PRACH resources and the probability of selecting one PRACH resource on a given non-anchor carrier is (1−nprach-ProbabilityAnchor)/(number of non-anchor NPRACH resources)
the criteria to select PRACH resources based on RSRP measurement per enhanced coverage level supported in the Serving Cell rsrp-ThresholdsPrachInfoList.
the maximum number of preamble transmission attempts per enhanced coverage level supported in the Serving Cell maxNumPreambleAttemptCE.
the number of repetitions required for preamble transmission per attempt for each enhanced coverage level supported in the Serving Cell numRepetitionPerPreambleAttempt.
the configured UE transmitted power of the Serving Cell performing the Random Access Procedure, PCMAX, c.
the RA response window size ra-ResponseWindowSize and the Contention Resolution Timer mac-ContentionResolutionTimer (SpCell only) per enhanced coverage level supported in the Serving Cell.
for EDT, the Contention Resolution Timer mac-ContentionResolutionTimer configured for EDT (SpCell only) per enhanced coverage level supported in the Serving Cell.
the power-ramping factor powerRampingStep and optionally powerRampingStepCE1.
the maximum number of preamble transmission preambleTransMax-CE.
the initial preamble power preambleInitialReceivedTargetPower and optionally preambleInitialReceivedTargetPowerCE1.
the preamble format based offset DELTA PREAMBLE. For NB-IoT the DELTA PREAMBLE is set to 0.
for NB-IoT, the use of contention free random access ra-CFRA-Config.

The Random Access procedure shall be performed as follows:

Flush the Msg3 buffer;
set the PREAMBLE TRANSMISSION COUNTER to 1;
if the UE is an NB-IoT UE, a BL UE or a UE in enhanced coverage:
set the PREAMBLE TRANSMISSION COUNTER CE to 1;
if the starting enhanced coverage level, or for NB-IoT the starting number of NPRACH repetitions, has been indicated in the PDCCH order which initiated the Random Access procedure, or if the starting enhanced coverage level has been provided by upper layers:
the MAC entity considers itself to be in that enhanced coverage level regardless of the measured RSRP;
else:
if the RSRP threshold of enhanced coverage level 3 is configured by upper layers in rsrp-ThresholdsPrachInfoList and the measured RSRP is less than the RSRP threshold of enhanced coverage level 3 and the UE is capable of enhanced coverage level 3 then:
the MAC entity considers to be in enhanced coverage level 3;
else if the RSRP threshold of enhanced coverage level 2 configured by upper layers in rsrp-ThresholdsPrachInfoList and the measured RSRP is less than the RSRP threshold of enhanced coverage level 2 and the UE is capable of enhanced coverage level 2 then:
the MAC entity considers to be in enhanced coverage level 2;
else if the measured RSRP is less than the RSRP threshold of enhanced coverage level 1 as configured by upper layers in rsrp-ThresholdsPrachInfoList then:
the MAC entity considers to be in enhanced coverage level 1;
else:
the MAC entity considers to be in enhanced coverage level 0;
set the backoff parameter value to 0 ms;
for the RN, suspend any RN subframe configuration;
proceed to the selection of the Random Access Resource.

There is only one Random Access procedure ongoing at any point in time in a MAC entity. If the MAC entity receives a request for a new Random Access procedure while another is already ongoing in the MAC entity, it is up to UE implementation whether to continue with the ongoing procedure or start with the new procedure.

An NB-IoT UE measures RSRP on the anchor carrier.

Downlink assignments transmitted on the PDCCH indicate if there is a transmission on a DL-SCH for a particular MAC entity and provide the relevant HARQ information.

When the MAC entity has a C-RNTI, Semi-Persistent Scheduling C-RNTI, or Temporary C-RNTI, the MAC entity shall for each TTI during which it monitors PDCCH and for each Serving Cell:
if a downlink assignment for this TTI and this Serving Cell has been received on the PDCCH for the MAC entity's C-RNTI, or Temporary C-RNTI:
if this is the first downlink assignment for this Temporary C-RNTI:
consider the NDI to have been toggled.
if the downlink assignment is for the MAC entity's C-RNTI and if the previous downlink assignment indicated to the HARQ entity of the same HARQ process was either a downlink assignment received for the MAC entity's Semi-Persistent Scheduling C-RNTI or a configured downlink assignment:
consider the NDI to have been toggled regardless of the value of the NDI.
indicate the presence of a downlink assignment and deliver the associated HARQ information to the HARQ entity for this TTI.
else, if this Serving Cell is the SpCell and a downlink assignment for this TTI has been received for the SpCell on the PDCCH of the SpCell for the MAC entity's Semi-Persistent Scheduling C-RNTI:
if the NDI in the received HARQ information is 1:
consider the NDI not to have been toggled;
indicate the presence of a downlink assignment and deliver the associated HARQ information to the HARQ entity for this TTI.
else, if the NDI in the received HARQ information is 0:
if PDCCH contents indicate SPS release:
clear the configured downlink assignment (if any);
if the timeAlignmentTimer associated with the pTAG is running:
indicate a positive acknowledgement for the downlink SPS release to the physical layer.
else:
store the downlink assignment and the associated HARQ information as configured downlink assignment;
initialise (if not active) or re-initialise (if already active) the configured downlink assignment to start in this TTI and to recur according to rules;
set the HARQ Process ID to the HARQ Process ID associated with this TTI;
consider the NDI bit to have been toggled;
indicate the presence of a configured downlink assignment and deliver the stored HARQ information to the HARQ entity for this TTI.
else, if this Serving Cell is the SpCell and a downlink assignment for this TTI has been configured for the SpCell and there is no measurement gap in this TTI and there is no Sidelink Discovery Gap for Reception in this TTI; and
if this TTI is not an MBSFN subframe of the SpCell or the MAC entity is configured with transmission mode tm9 or tm10 on the SpCell:
instruct the physical layer to receive, in this TTI, transport block on the DL-SCH according to the configured downlink assignment and to deliver it to the HARQ entity;
set the HARQ Process ID to the HARQ Process ID associated with this TTI;
consider the NDI bit to have been toggled;
indicate the presence of a configured downlink assignment and deliver the stored HARQ information to the HARQ entity for this TTI.
if the MAC entity is configured with rach-Skip or rach-SkipSCG and a UE Contention Resolution Identity MAC control element for this TTI has been received on the PDSCH indicated by the PDCCH of the SpCell addressed to the C-RNTI:
indicate to upper layer the successful reception of a PDCCH transmission addressed to the C-RNTI.

Early data transmission (EDT) is described.

With the introduction of the new RRC state (i.e., RRC-INACTIVE state) in NR, the UE may incur minimum signaling, minimize power consumption, minimize resource costs in the network. In order to support this concept in NR, the UE may also be able to transmit the data without state transition from the RRC-INACTIVE to the RRC-CONNECTED. Early data transmission (EDT) refers to the operation of transmitting data before the RRC connection setup is completed, if the size of the data to be transmitted is small. In other words, according to the EDT, data transmission is allowed even when the UE is not in the RRC connection state.

EDT allows one uplink data transmission optionally followed by one downlink data transmission during the random access procedure.

EDT is triggered when the upper layers have requested the establishment or resumption of the RRC Connection for Mobile Originated data (i.e., not signalling or SMS) and the uplink data size is less than or equal to a TB size indicated in the system information. EDT is not used for data over the control plane when using the User Plane CIoT EPS optimizations.

EDT is only applicable to BL UEs, UEs in Enhanced Coverage and NB-IoT UEs.

EDT for Control Plane CIoT EPS optimizations is characterized as below:
Uplink user data are transmitted in a NAS message concatenated in UL RRCEarlyDataRequest message on CCCH;
Downlink user data are optionally transmitted in a NAS message concatenated in DL RRCEarlyDataComplete message on CCCH;
There is no transition to RRC CONNECTED.

The EDT procedure for Control Plane CIoT EPS optimizations is described as below.

1. Upon connection establishment request for Mobile Originated data from the upper layers, the UE initiates the early data transmission procedure and selects a random access preamble configured for EDT.

2. UE sends RRCEarlyDataRequest message concatenating the user data on CCCH.

3. The eNB initiates the S1-AP Initial UE message procedure to forward the NAS message and establish the S1 connection. The eNB may indicate in this procedure that this connection is triggered for EDT.

4. The MME requests the S-GW to re-activate the EPS bearers for the UE.

5. The MME sends the uplink data to the S-GW.

6. If downlink data are available, the S-GW sends the downlink data to the MME.

7. If downlink data are received from the S-GW, the MME forwards the data to the eNB via DL NAS Transport procedure and may also indicate whether further data are expected. Otherwise, the MME may trigger Connection Establishment Indication procedure and also indicate whether further data are expected.

8. If no further data are expected, the eNB can send the RRCEarlyDataComplete message on CCCH to keep the UE in RRC_IDLE. If downlink data were received in step 7, they are concatenated in RRCEarlyDataComplete message.

9. The S1 connection is released and the EPS bearers are deactivated.

If the MME or the eNB decides to move the UE in RRC_CONNECTED mode, RRCConnectionSetup message is sent in step 8 to fall back to the legacy RRC Connection establishment procedure; the eNB will discard the zero-length NAS PDU received in msg5.

EDT for User Plane CIoT EPS optimizations is characterized as below:
Uplink user data are transmitted on DTCH multiplexed with UL RRCConnectionResumeRequest message on CCCH;
Downlink user data are optionally transmitted on DTCH multiplexed with DL RRCConnectionRelease message on DCCH;
The user data in uplink and downlink are ciphered. The keys are derived using the NextHopChainingCount provided in the RRCConnectionRelease message of the previous RRC connection;
There is no transition to RRC CONNECTED.

The EDT procedure for User Plane CIoT EPS optimizations is described as below.

0. Upon connection resumption request for Mobile Originated data from the upper layers, the UE initiates the early data transmission procedure and selects a random access preamble configured for EDT.

1. The UE sends an RRCConnectionResumeRequest to the eNB, including its Resume ID, the establishment cause, and an authentication token. The UE resumes all SRBs and DRBs, derives new security keys using the NCC provided in the RRCConnectionRelease message of the previous connection and re-establishes the AS security. The user data are ciphered and transmitted on DTCH multiplexed with the RRCConnectionResumeRequest message on CCCH.

2. The eNB initiates the S1-AP Context Resume procedure to resume the S1 connection and re-activate the S1-U bearers.

3. The MME requests the S-GW to re-activate the S1-U bearers for the UE.

4. The MME confirms the UE context resumption to the eNB.

5. The uplink data are delivered to the S-GW.

6. If downlink data are available, the S-GW sends the downlink data to the eNB.

7. If no further data are expected from the S-GW, the eNB can send the RRCConnectionRelease message to keep (FFS transit) the UE in RRC_IDLE. The message includes the releaseCause set to rrc-Suspend, the resumeID and the NextHopChainingCount which are stored by the UE. If downlink data were received in step 6, they are sent ciphered on DTCH multiplexed with the RRCConnectionRelease message on DCCH.

8. The S1 connection is suspended and the S1-U bearers are deactivated.

If the MME or eNB decides the UE to move in RRC_CONNECTED mode, RRCConnectionResume message is sent in step 7 to fall back to the legacy RRC Connection resume procedure.

Figure 7:
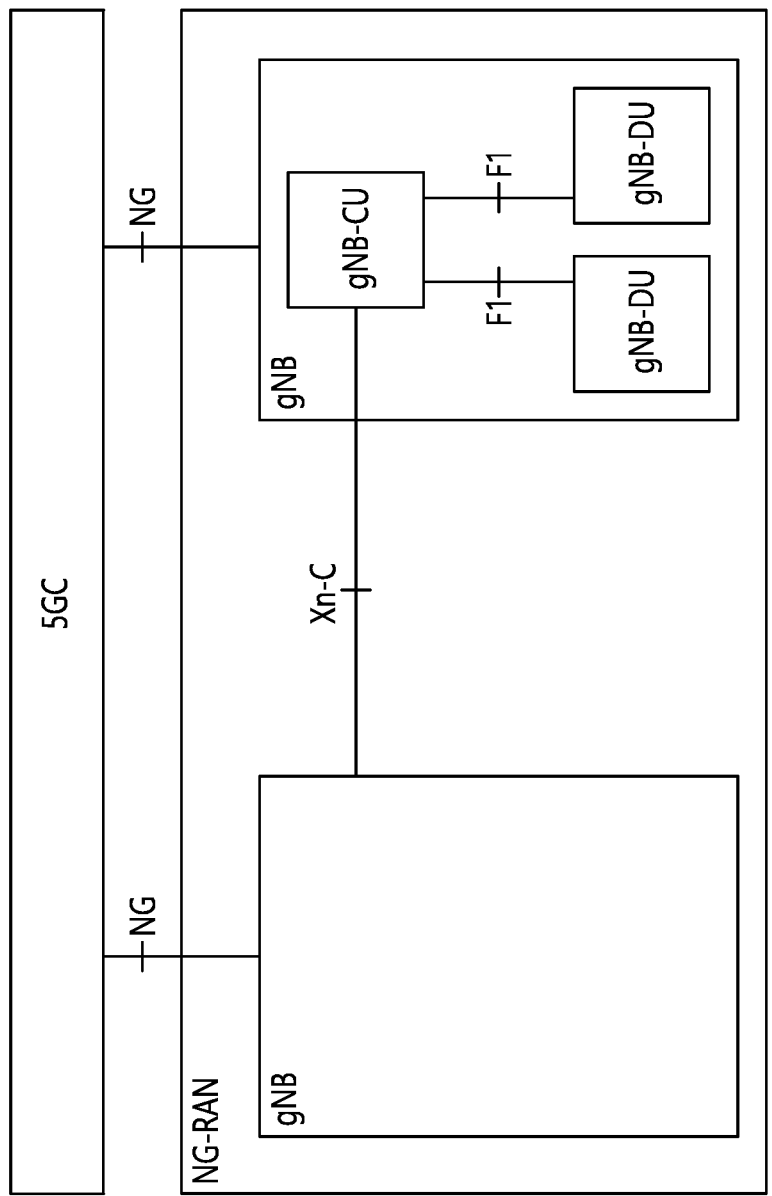
FIG. 7 shows an example of the overall architecture of an NG-RAN.

FIG. 7 shows an example of the overall architecture of an NG-RAN to which technical features of the present disclosure can be applied.

Referring to FIG. 7, a gNB may include a gNB-CU (hereinafter, gNB-CU may be simply referred to as CU) and at least one gNB-DU (hereinafter, gNB-DU may be simply referred to as DU).

The gNB-CU is a logical node hosting RRC, SDAP and PDCP protocols of the gNB or an RRC and PDCP protocols of the en-gNB. The gNB-CU controls the operation of the at least one gNB-DU.

The gNB-DU is a logical node hosting RLC, MAC, and physical layers of the gNB or the en-gNB. The operation of the gNB-DU is partly controlled by the gNB-CU. One gNB-DU supports one or multiple cells. One cell is supported by only one gNB-DU.

The gNB-CU and gNB-DU are connected via an F1 interface. The gNB-CU terminates the F1 interface connected to the gNB-DU. The gNB-DU terminates the F1 interface connected to the gNB-CU. One gNB-DU is connected to only one gNB-CU. However, the gNB-DU may be connected to multiple gNB-CUs by appropriate implementation. The F1 interface is a logical interface. For NG-RAN, the NG and Xn-C interfaces for a gNB consisting of a gNB-CU and gNB-DUs, terminate in the gNB-CU. For E-UTRAN-NR dual connectivity (EN-DC), the S1-U and X2-C interfaces for a gNB consisting of a gNB-CU and gNB-DUs, terminate in the gNB-CU. The gNB-CU and connected gNB-DUs are only visible to other gNBs and the 5GC as a gNB.

The node hosting user plane part of NR PDCP (e.g., gNB-CU, gNB-CU-UP, and for EN-DC, MeNB or SgNB depending on the bearer split) shall perform user inactivity monitoring and further informs its inactivity or (re)activation to the node having C-plane connection towards the core network (e.g., over E1, X2). The node hosting NR RLC (e.g., gNB-DU) may perform user inactivity monitoring and further inform its inactivity or (re)activation to the node hosting control plane, e.g., gNB-CU or gNB-CU-CP.

UL PDCP configuration (i.e., how the UE uses the UL at the assisting node) is indicated via X2-C (for EN-DC), Xn-C (for NG-RAN) and F1-C. Radio Link outage/resume for DL and/or UL is indicated via X2-U (for EN-DC), Xn-U (for NG-RAN) and F1-U.

The NG-RAN is layered into a radio network layer (RNL) and a transport network layer (TNL).

The NG-RAN architecture, i.e., the NG-RAN logical nodes and interfaces between them, is defined as part of the RNL.

Functions of the F1 interface includes F1 control (F1-C) functions as follows.

(1) F1 interface management function

The error indication function is used by the gNB-DU or gNB-CU to indicate to the gNB-CU or gNB-DU that an error has occurred.

The reset function is used to initialize the peer entity after node setup and after a failure event occurred. This procedure can be used by both the gNB-DU and the gNB-CU.

The F1 setup function allows to exchange application level data needed for the gNB-DU and gNB-CU to interoperate correctly on the F1 interface. The F1 setup is initiated by the gNB-DU.

The gNB-CU configuration update and gNB-DU configuration update functions allow to update application level configuration data needed between gNB-CU and gNB-DU to interoperate correctly over the F1 interface, and may activate or deactivate cells.

The F1 setup and gNB-DU configuration Update functions allow to inform the single network slice selection assistance information (S-NSSAI) supported by the gNB-DU.

The F1 resource coordination function is used to transfer information about frequency resource sharing between gNB-CU and gNB-DU.

(2) System Information management function

Scheduling of system broadcast information is carried out in the gNB-DU. The gNB-DU is responsible for transmitting the system information according to the scheduling parameters available.

The gNB-DU is responsible for the encoding of NR master information block (MIB). In case broadcast of system information block type-1 (SIB1) and other SI messages is needed, the gNB-DU is responsible for the encoding of SIB1 and the gNB-CU is responsible for the encoding of other SI messages.

(3) F1 UE context management function

The F1 UE context management function supports the establishment and modification of the necessary overall UE context.

The establishment of the F1 UE context is initiated by the gNB-CU and accepted or rejected by the gNB-DU based on admission control criteria (e.g., resource not available).

The modification of the F1 UE context can be initiated by either gNB-CU or gNB-DU. The receiving node can accept or reject the modification. The F1 UE context management function also supports the release of the context previously established in the gNB-DU. The release of the context is triggered by the gNB-CU either directly or following a request received from the gNB-DU. The gNB-CU request the gNB-DU to release the UE Context when the UE enters RRC_IDLE or RRC_INACTIVE.

This function can be also used to manage DRBs and SRBs, i.e., establishing, modifying and releasing DRB and SRB resources. The establishment and modification of DRB resources are triggered by the gNB-CU and accepted/rejected by the gNB-DU based on resource reservation information and QoS information to be provided to the gNB-DU. For each DRB to be setup or modified, the S-NSSAI may be provided by gNB-CU to the gNB-DU in the UE context setup procedure and the UE context modification procedure.

The mapping between QoS flows and radio bearers is performed by gNB-CU and the granularity of bearer related management over F1 is radio bearer level. To support packet duplication for intra-gNB-DU carrier aggregation (CA), one data radio bearer should be configured with two GPRS tunneling protocol (GTP)-U tunnels between gNB-CU and a gNB-DU.

With this function, gNB-CU requests the gNB-DU to setup or change of the special cell (SpCell) for the UE, and the gNB-DU either accepts or rejects the request with appropriate cause value.

With this function, the gNB-CU requests the setup of the secondary cell(s) (SCell(s)) at the gNB-DU side, and the gNB-DU accepts all, some or none of the SCell(s) and replies to the gNB-CU. The gNB-CU requests the removal of the SCell(s) for the UE.

(4) RRC message transfer function

This function allows to transfer RRC messages between gNB-CU and gNB-DU. RRC messages are transferred over F1-C. The gNB-CU is responsible for the encoding of the dedicated RRC message with assistance information provided by gNB-DU.

(5) Paging function

The gNB-DU is responsible for transmitting the paging information according to the scheduling parameters provided.

The gNB-CU provides paging information to enable the gNB-DU to calculate the exact paging occasion (PO) and paging frame (PF). The gNB-CU determines the paging attempt (PA). The gNB-DU consolidates all the paging records for a particular PO, PF and PA, and encodes the final RRC message and broadcasts the paging message on the respective PO, PF in the PA.

(6) Warning messages information transfer function

This function allows to cooperate with the warning message transmission procedures over NG interface. The gNB-CU is responsible for encoding the warning related SI message and sending it together with other warning related information for the gNB-DU to broadcast over the radio interface.

NR supports multiple numerology (or, subcarrier spacing (SCS)) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

In 5G NR, discussion on how the early data transmission without the RRC state transition can be supported in RRC_INACTIVE state is in progress. Especially, there will be a problem for the EDT in RRC_INACTIVE state considering the CU-DU split.

When there is the small uplink (UL) data to the SGC, the UE is able to decide to keep the UE in RRC_INACTIVE state and to use the EDT for the UL data via the control plane or user plane. For the mobile-oriented (MO) EDT via the user plane, the gNB-DU extracts the UL data from the RRC message. However, the gNB-DU does not know the F1 UL TEIDs towards the last serving gNB-CU-UP. In addition, whenever the EDT is triggered, the gNB-CU-UP has to resume the bearer context to forward the UL data to the SGC. This causes the unnecessary signaling between the gNB-CU-CP and gNB-CU-UP via E1 interface. To reduce unnecessary signaling, it may be needed to consider how to manage the bearer context in the gNB-CU-UP.

For the mobile-terminated (MT) EDT via the user plane, the gNB-DU is difficult to know that the DL data should be transmitted on DTCH multiplexed with DL RRC message on DCCH. This means that the gNB-CU-CP needs to indicate to the gNB-DU whether the MT EDT is triggered or not. Therefore, since the gNB-CU-CP decides whether the RRC state transition is required and whether the EDT can be used, it may be needed to indicate to the gNB-DU whether the MT EDT is triggered or not.

For the MT EDT via the control plane, the AMF just sends the NAS PDU to the last serving gNB-CU-CP. Since the UE is in the RRC_INACTIVE state, there is no RRC connection between the UE and the gNB-CU-CP. Therefore, the Paging procedure is triggered to find the UE in the RNA. In this scenario, the NAS PDU can be forwarded to the gNB-DU to deliver it to UE as quickly as possible. Alternatively, the gNB-CU-CP stores the NAS PDU until the reception of the paging response from the UE. However, there may be a critical delay because the gNB-DU needs to report the access of the UE to the gNB-CU-CP and then the NAS PDU is delivered to the UE via the gNB-DU.

In this disclosure, gNB-CU and gNG-DU may be referred as CU and DU, respectively. The CU may include CP (CU-CP) and UP (CU-UP). Further, CU and DU may be embodied by the base station. The base station may be, for example, gNB or eNB.

Figure 8:
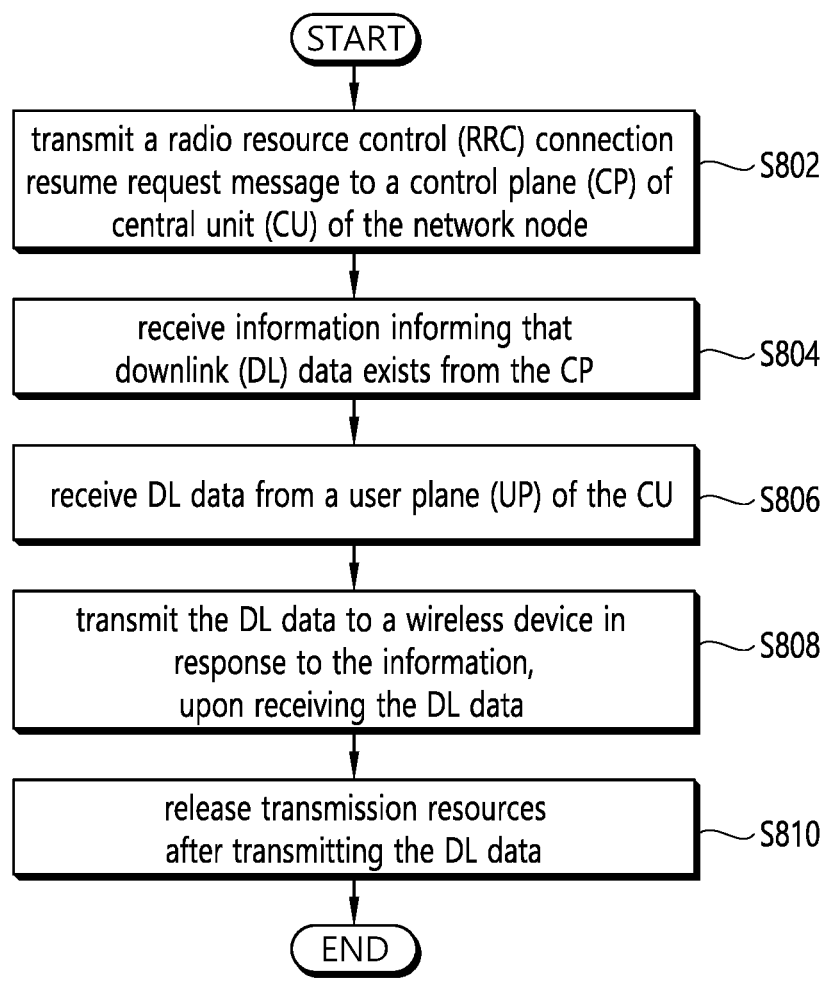
FIG. 8 shows a method for performing EDT according to an embodiment of the present disclosure.

FIG. 8 shows a method for performing EDT according to an embodiment of the present disclosure.

In step S802, a distributed unit (DU) may transmit a radio resource control (RRC) connection resume request message to a control plane (CP) of central unit (CU) of the network node.

In step S804, the DU may receive information informing that downlink (DL) data exists from the CP. The information may be received via F1 message. The information may be transmitted with a RRC message. The RRC message may inform to release the transmission resources. The information may inform the DU of waiting for releasing the transmission resources until reception of the DL data In step S806, the DU may receive DL data from a user plane (UP) of the CU.

In step S808, the DU may transmit the DL data to a wireless device in response to the information, upon receiving the DL data. The transmitting the DL data may include multiplexing the DL data with the RRC message.

In step S810, the DU may release transmission resources after transmitting the DL data.

Further, the DU may transmit uplink (UL) data to the UP, when it is determined to perform early data transmission (EDT) by the CP based on the RRC connection resume request message. The UL link data may be forwarded to a core network upon successful resume of a bearer context of the wireless device.

According to embodiments of the present disclosure, unnecessary signals between DU and CU during the EDT may be removed. In specific, the CU-CP may efficiently control whether the DU forwards the RRC message to the UE immediately, and whether the bearer context in the CU-UP should be fully resumed or not. Therefore, the performance of the UE may be better since the loss of DL data can be avoided and the unnecessary latency due to the data retransmission can be reduced.

Figure 9A:
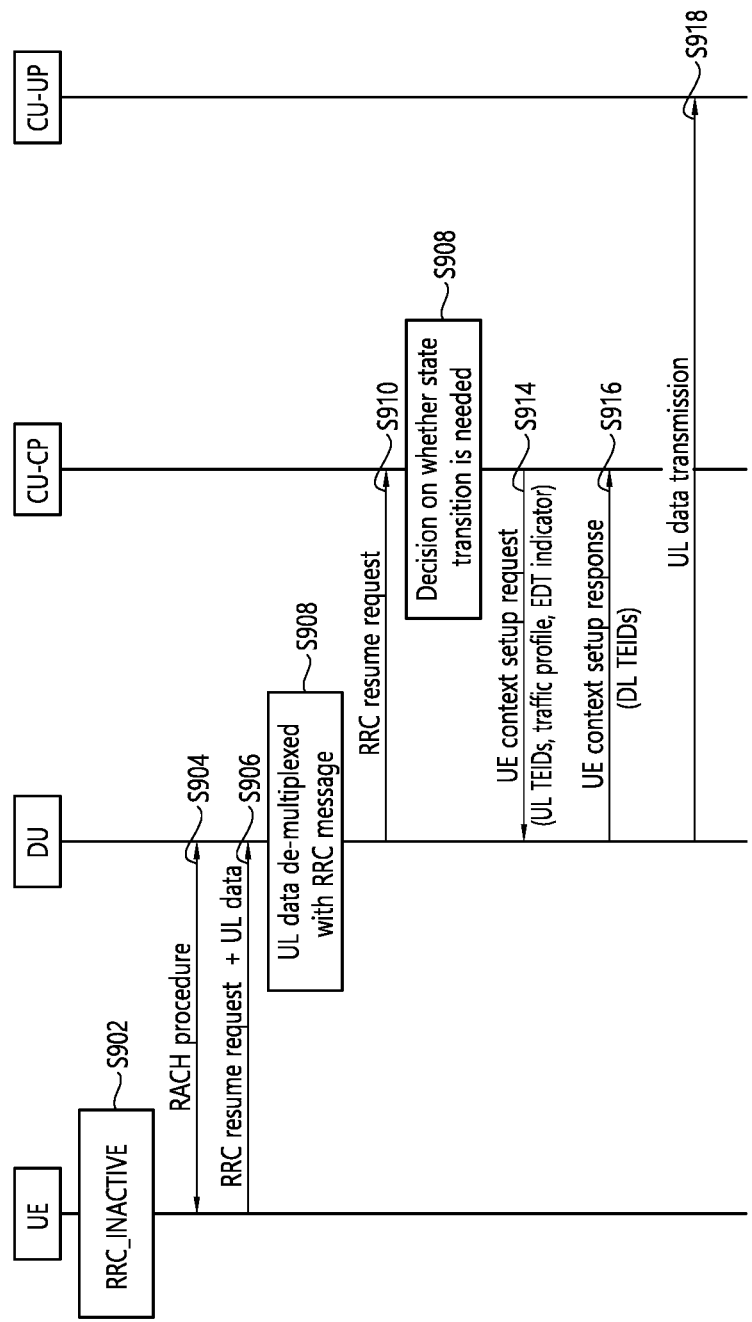
FIGS. 9a and 9b show a method for performing EDT according to an embodiment of the present disclosure.
Figure 9B:
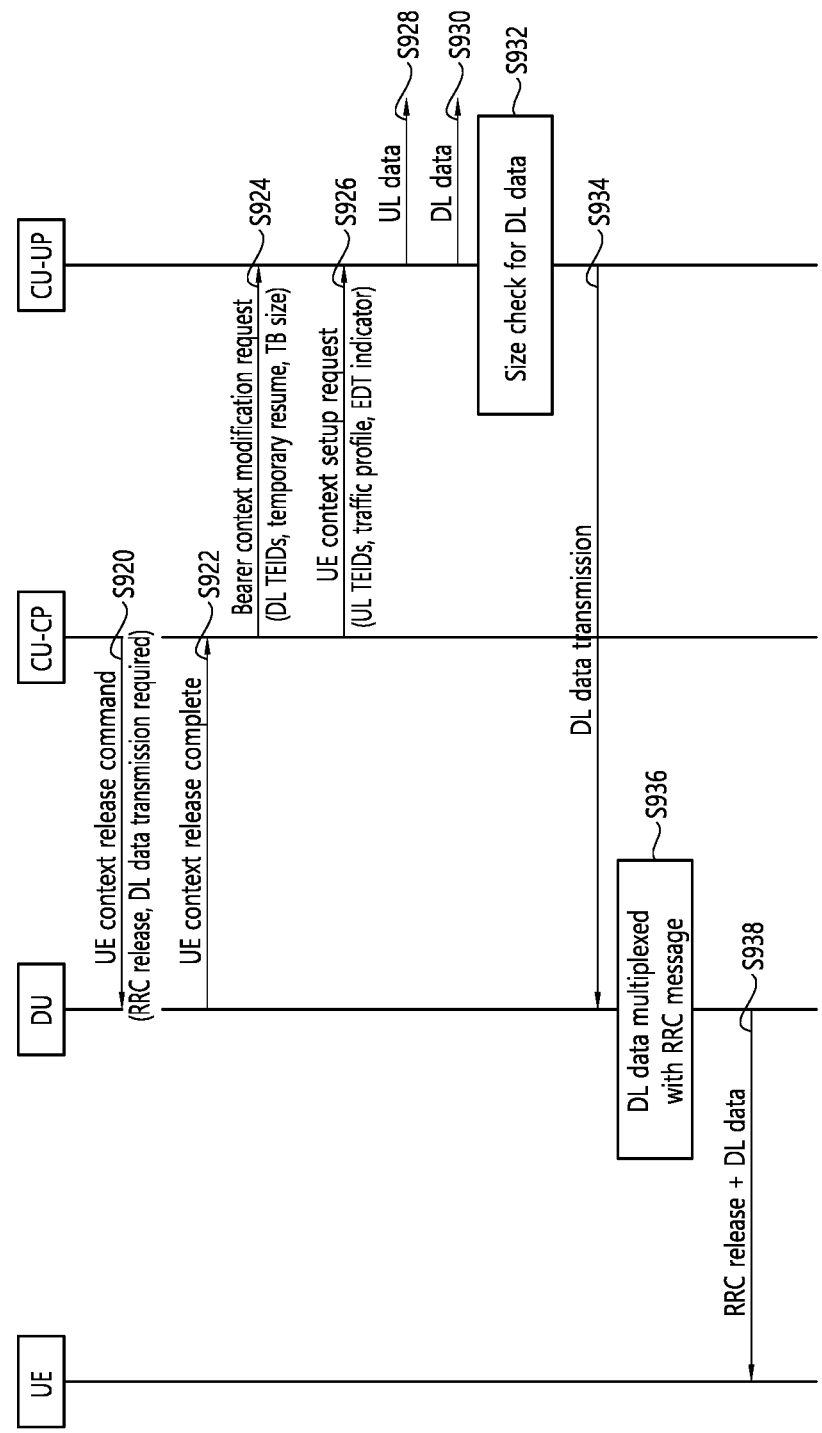

FIGS. 9a and 9b show a method for performing EDT according to an embodiment of the present disclosure. In this embodiment, it may be suggested that the CU-CP prevents the DU from forwarding the RRC message towards the UE. When the CU-CP is aware of the single DL transmission by using the MT EDT, the CU-CP may request the DU to waiting to transmit the RRC message towards the UE until the reception of the DL data. Therefore, the DU may transmit the RRC message (for example, RRC release message) with the DL data to UE. For the case where the UE temporarily resumes for the single UL transmission with or without the subsequent DL, the CU-CP may also indicate to the CU-UP that temporary resume for the bearer context is needed.

Referring to FIGS. 9a and 9b, a procedure for early data transmission with mobile oriented (MO) data in CU-DU split considering 5G UP optimization according to one embodiment of the present disclosure is disclosed. In this embodiment, a UE may be not only a terminal device, but also any types of device operating as wireless device, for example, an integrated access backhaul (IAB) node. Therefore, a UE may be referred as a wireless device.

Referring to FIG. 9a, in step S902, the UE may be in RRC-INACTIVE state. The UE and last serving CU may store the UE context, respectively. The NG-C connection between last serving CU-CP and AMF may be maintained. In addition, the NG-U connection between last serving CU-UP and UPF may be maintained. The F1 connection between last serving CU and DU may be disconnected.

In step S904, the UE may initiate RACH procedure when a connection resumption for MO data is requested by the upper layers. In other words, upon connection resumption request for MO data from the upper layers, the UE may initiate the early data transmission procedure and selects a random access preamble configured for EDT.

In step S906, the UE may send an RRC resume request message or new message to the DU, including its I-RNTI. The uplink user data may be ciphered and transmitted on DTCH multiplexed with the RRC resume request message or new message on CCCH. The uplink user data may be also referred as UL data.

In step S908, in the DU, the UL data may be de-multiplexed with the RRC resume request message. In this case, since the DU does not know the F1 UL TEIDs towards the last serving CU-UP, the UL data may be buffered.

In step S910, the DU may send to the last serving CU-CP the initial UL RRC message transfer message including the RRC resume request message.

In step S912, the CU-CP may determine whether state transition is needed. In other words, on receiving the RRC resume request message including the I-RNTI from the DU, the last serving CU-CP may first check whether it is able to find the UE context related to the I-RNTI or not. When the last serving CU-CP may be able to identify the UE context by means of the I-RNTI, the CU-CP may decide whether the RRC state transition is needed or not, based on the expected UE behavior, AS based Release Assistance Information by UE, and so on. When no further subsequent data are expected or there is only one acknowledgement for the UL data, the CU-CP may decide to keep the UE in RRC_INACTIVE state. If not, the CU-CP may decide to move the UE in RRC_CONNECTED state for potential subsequent UL or DL.

In step S914, the last serving CU-CP may send the UE context setup request message including the stored F1 UL TEIDs to create the UE context in the DU. The UE context setup request message may be replaced by a F1AP message. The UE context setup request message may contain the traffic profile and/or EDT indicator. The traffic profile may indicate to the DU the type of data transmission. For example, the traffic profile may indicate at least one of single packet transmission (UL or DL), dual packet transmission (UL with subsequent DL or DL with subsequent UL) or multiple packets transmission. Based on this information, the DU may perform specific handling for the UE. In addition, the DU may realize that the EDT may be occurred for the UE based on the EDT indicator.

In step S916, the DU may transmit a response message. The response message in this step may by a UE context setup response message. The response message may include the F1 DL TEIDs allocated for the DRBs. If the single packet transmission (i.e., UL only) is indicated in the traffic profile, the DU may skip the allocation for the F1 DL TEIDs.

In step S918, the DU may forward the UL data to the last serving CU-UP. Then, the UL data may be buffered at the last serving CU-UP.

Referring to FIG. 9b, in step S920, when the CU-CP decides to keep the UE in RRC_INACTIVE as described in step S912, the CU-CP may send a message informing that the UE needs to stay in RRC_INACTIVE state. The message may be at least one of a RRC release message, UE context release command message or new message on DCCH. If there is only single DL data from 5GC (e.g., acknowledgement for the UL data), the last serving CU-CP also may contain the indication "DL data transmission required" into the message to indicate to the DU that the DL user data should be transmitted on DTCH multiplexed with the RRC release message on DCCH. In this case, the DU may wait until receiving the DL data to transmit the RRC release message with the DL data. The signaling between the DU and the CU-CP may be reduced by waiting until reception of DL data by DU.

In step S922, the DU may send the UE context release complete message to the CU-CP. If the indication "DL data transmission required" is included into the UE context release command message, the DU may release all related signaling and user data transport resources after the transmission of the RRC message multiplexed with the DL data towards the UE.

In step S924, the last serving CU-CP may send the bearer context modification request message. The CU-CP may transmit an indication "Temporary resume", which indicates that the UE temporarily resumes from RRC_INACTIVE state for single UL with or without subsequent DL transmission. That is, after the single UL transmission, the CU-UP may change the bearer context status as "Suspend" automatically.

The last serving CU-CP also may include the F1 DL TEIDs received from the DU in step S916. This message may also contain the TB size. For the case where the downlink data size is less than or equal to a TB size, the EDT for the DL data may be triggered. If not, the CU-UP should indicate to the CU-CP that the state transition to the RRC_CONNECTED is required to deliver the DL data towards the UE.

The step S920 and S924 may be performed in parallel.

In step S926, the CU-UP may respond with the bearer context modification response message.

In step S928, when the CU-UP is successful to temporarily resume the UE context in step S924, then the CU-UP may forward the buffered UL data (as described in step S918) to the UPF via the NG-U interface.

In step S930, if downlink data are available, the UPF may send the downlink data to the CU-UP.

In step S932, if the downlink is received in step S930 the CU-UP should check the downlink data size compared to the TB size received in step S924. For the case where the downlink data size is less than or equal to a TB size, the EDT for the DL data is used. If not, the CU-UP should indicate to the CU-CP that the state transition to the RRC_CONNECTED is required to deliver the DL data towards the UE. In this case, the CU-CP may decide to move the UE in RRC_CONNECTED state to send the downlink data to the UE.

In step S934, when downlink data are available and the EDT can be used in step S932, the CU-UP may send the downlink data to the DU.

In step S936, if downlink data were received in step S934, the downlink data may be sent ciphered on DTCH multiplexed with the RRC release message or new message on DCCH.

In step S938, the DU may send an RRC release message or new message to the UE.

According to embodiments of the present disclosure, EDT may be performed without unnecessary signals between DU and CU. In specific, the CU-CP may efficiently control whether the DU forwards the RRC message to the UE immediately, and whether the bearer context in the CU-UP should be fully resumed or not. Therefore, the performance of the UE may be better since the loss of DL data can be avoided and the unnecessary latency due to the data retransmission can be reduced.

Figure 10A:
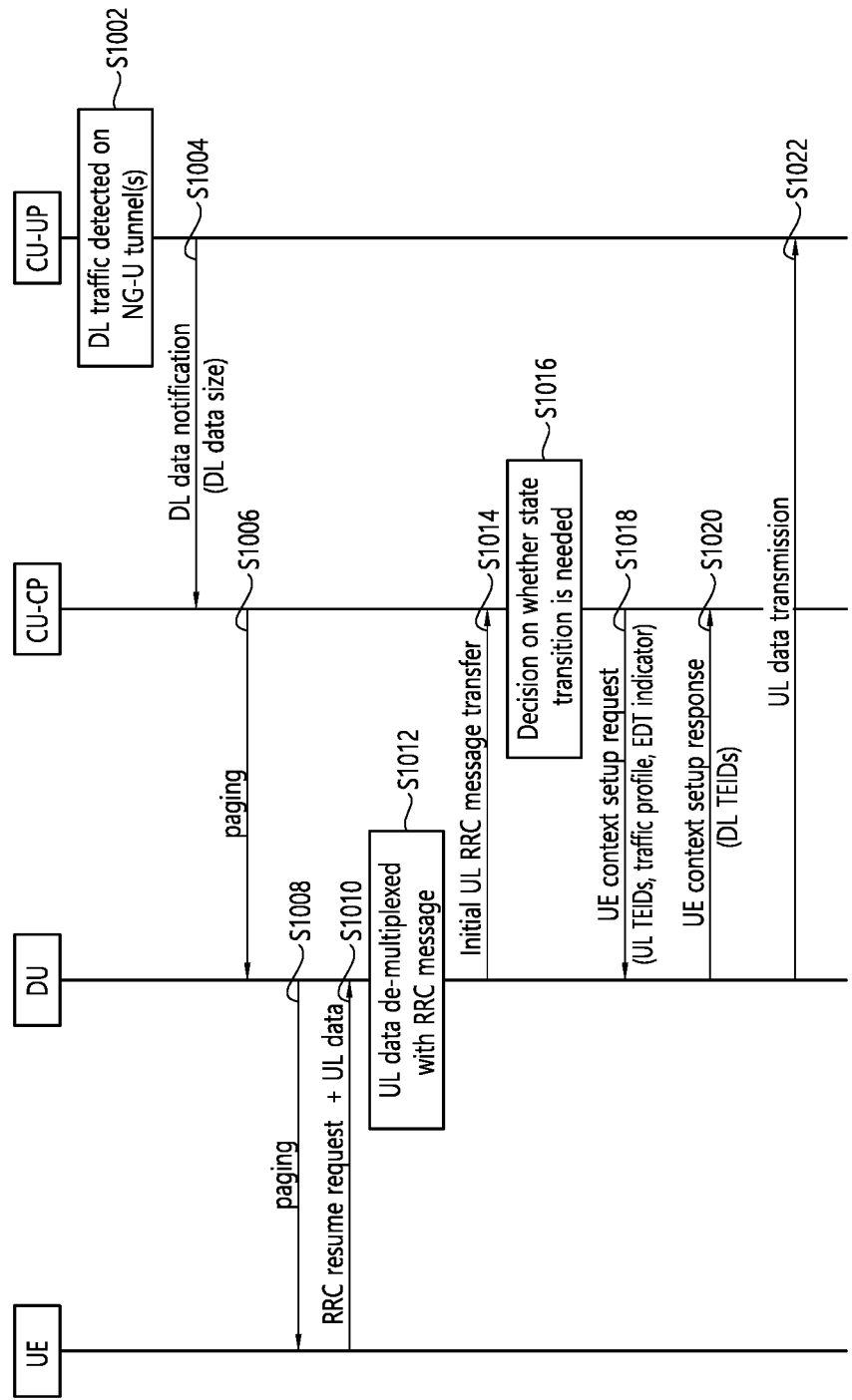
FIGS. 10a and 10b show a method for performing EDT according to an embodiment of the present disclosure.
Figure 10B:
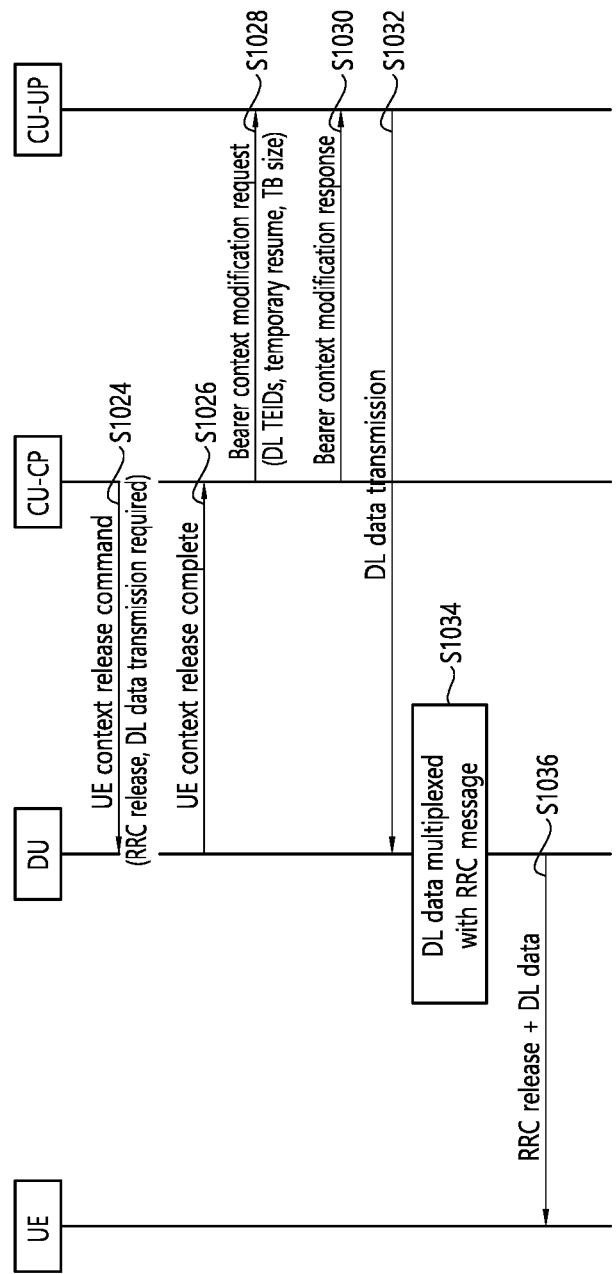

FIGS. 10a and 10b show a method for performing EDT according to an embodiment of the present disclosure. In this embodiment, the procedure for early data transmission with Mobile Terminated (MT) data in CU-DU split considering 5G UP optimization may be provided.

In this embodiment, a UE may be not only a terminal device, but also any types of device operating as wireless device, for example, an integrated access backhaul (IAB) node. Therefore, a UE may be referred as a wireless device.

As an initial condition, the UE may be in RRC-INACTIVE state. The UE and last serving CU may store the UE context, respectively. The NG-C connection between last serving CU-CP and AMF may be maintained. In addition, the NG-U connection between last serving CU-UP and UPF may be maintained. The F1 connection between last serving CU and DU may be disconnected.

Referring to FIG. 10a, in step S1002, the last serving CU-UP may receive DL data on NG-U interface. The CU-UP may detect DL traffic on the NG-U tunnel.

In step S1004, the CU-UP may send E1AP DL data notification message to the CU-CP. This message may contain information on the size for the downlink data.

In step S1006, the last serving CU-CP may initiate F1AP paging procedure.

In step S1008, the DU may send the paging message to the UE.

In step S1010, the UE may send RRC resume request message upon RAN-based paging. If there is the uplink data towards the SGC, the UE may initiate the early data transmission procedure and select a random access preamble configured for EDT. In this case, the uplink user data may be ciphered and transmitted on DTCH multiplexed with the RRC resume request message or new message on CCCH.

In step S1012, if there is the uplink data, the UL data may be de-multiplexed with the RRC resume request message in the DU. In this case, since the DU does not know the F1 UL TEIDs towards the last serving CU-UP, the UL data may need to be buffered.

In step S1014, the DU may send to the last serving CU-CP the initial UL RRC message transfer message including the RRC resume request message.

In step S1016, on receiving the RRC resume request message including the I-RNTI from the DU, the last serving CU-CP may first check whether it is able to find the UE context related to the I-RNTI or not. When the last serving CU-CP is able to identify the UE context by means of the I-RNTI, the CU-CP may decide whether the RRC state transition is needed or not, based on at least one of the expected UE behavior, AS based Release Assistance Information by UE, or the downlink data size received in step S904. When no further subsequent data are expected or there is only one acknowledgement for the UL data, the CU-CP may decide to keep the UE in RRC_INACTIVE state. If not, the CU-CP may decide to move the UE in RRC_CONNECTED state for potential subsequent UL or DL.

In step S1018, the last serving CU-CP may send the UE context setup request message including the stored F1 UL TEIDs to create the UE context in the DU. The UE context setup request message may contain the traffic profile and/or EDT indicator. The traffic profile may indicate to the DU the type of data transmission. The type of data transmission may be at least one of single packet transmission (UL or DL), dual packet transmission (UL with subsequent DL or DL with subsequent UL), or multiple packets transmission. Based on this information, the DU may perform specific handling for the UE. In addition, the DU may know that the EDT may be occurred for the UE based on the EDT indicator.

In step S1020, the DU may respond with the UE context setup response message including the F1 DL TEIDs allocated for the DRBs.

In step S1022, if there is the buffered uplink data, the DU may forward the UL data to the last serving CU-UP. Then, the UL data may be buffered at the last serving CU-UP.

Referring to FIG. 10b, in step S1024, if the CU-CP decides to keep the UE in RRC_INACTIVE as described in step S1016, CU-CP may send the RRC release message or new message on DCCH to keep the UE in RRC_INACTIVE. If there is only single DL data from SGC, the last serving CU-CP may also contain the indication "DL data transmission required" into the UE context release command message to indicate to the DU that the DL user data should be transmitted on DTCH multiplexed with the RRC release message on DCCH.

In step S1026, the DU may send the UE context release complete message to the CU-CP. If the indication "DL data transmission required" is included into the UE context release command message, the DU may release all related signaling and user data transport resources after the transmission of the RRC message multiplexed with the DL data towards the UE.

In step S1028, the last serving CU-CP may send the bearer context modification request message with an indication "Temporary resume", which indicates that the UE temporarily resumes from RRC_INACTIVE state for single DL transmission. That is, after the single DL transmission, the CU-UP may change the bearer context status as "Suspend" automatically. The last serving CU-CP may also include the F1 DL TEIDs received from the DU in step S1020. When the CU-UP is successful to temporarily resume the UE context in step S1028, CU-UP may forward the buffered UL data to the UPF via the NG-U interface.

The step S1024 and S1028 may be performed in parallel.

In step S1030, the CU-UP may respond with the bearer context modification response message.

In step S1032, the CU-UP may send the downlink data to the DU.

In step S1034, the downlink data may be sent ciphered on DTCH multiplexed with the RRC release message or new message on DCCH.

In step S1036, the DU may send an RRC release message or new message to the UE.

According to embodiments of the present disclosure, EDT may be performed without unnecessary signals between DU and CU. In specific, the CU-CP may efficiently control whether the gNB-DU forwards the RRC message to the UE immediately, and whether the bearer context in the gNB-CU-UP should be fully resumed or not. Therefore, the performance of the UE may be better since the loss of DL data can be avoided and the unnecessary latency due to the data retransmission can be reduced.

FIG. 11 shows a method for performing early data transmission (EDT) according to an embodiment of the present disclosure. In this embodiment, the procedure for EDT with MT data via control plane in CU-DU split (CU buffering) may be provided.

In this embodiment, the buffering of the NAS PDU in the CU-CP may be introduced. In this case, the CU-CP may indicate to the DU that the paging for MT EDT is needed.

When the DU is aware of the access of the UE, the DU may report to the CU-CP. Then, the CU-CP may forward the NAS PDU to the UE via the DU.

In this embodiment, a UE may be not only a terminal device, but also any types of device operating as wireless device, for example, an integrated access backhaul (IAB) node. Therefore, a UE may be referred as a wireless device.

As an initial condition, the UE may be in RRC-INACTIVE state. The UE and last serving CU may store the UE context. The NG-C connection between last serving gNB-CU-CP and AMF may be maintained. In addition, the NG-U connection between last serving gNB-CU-UP and UPF may be maintained. The F1 connection between last serving gNB-CU and gNB-DU may be disconnected.

In step S1102, on arrival of the downlink data packet, the AMF may send the NGAP downlink NAS transport message including the NAS PDU to the CU-CP.

In step S1104, the CU-CP may decide whether the RRC state transition is needed or not. That is, the CU-CP may determine whether EDT is possible or not. The decision on whether EDT is possible may depend on at least one of the expected UE behavior, or the downlink data size. The downlink data size may be a size of actual downlink (DL) data, for example, may include the NAS PDU referred in step S1102. When no further subsequent data are expected, the CU-CP may decide to keep the UE in RRC_INACTIVE state. If not, the CU-CP may decide to move the UE in RRC_CONNECTED state for potential subsequent UL or DL.

In addition, the CU-CP may check the downlink data size compared to the TB size. For the case where the downlink data size is less than or equal to a TB size, the EDT for the DL data may be used. If not, the CU-CP may move the UE in RRC_CONNECTED state to send the downlink data to the UE.

In step S1106, when the CU-CP may decide to keep the UE in RRC_INACTIVE state and the EDT for the DL data is possible, the CU-CP may send the F1AP PAGING message or new message including the EDT Indication, which indicates to the DU that the EDT for that UE is triggered.

In step S1108, on receiving the message including the EDT indication from the last serving CU-CP, the DU may decide the PRACH resource for the EDT.

In step S1110, the DU may send the paging message including the EDT indication to the UE. This message may also contain additional information (e.g., RNTI, Contention-free PRACH, DL grant), which is used for the UE to monitor (N)PDCCH after paging message for DL data scheduling.

In step S1112, if the dedicated (N)PRACH resource is allocated by the DU in step S1110, the UE may send the PRACH preamble to the DU.

In step S1114, upon receiving the dedicated preamble, the DU may schedule the DL data. Since the last serving CU-CP buffers NAS PDU for that UE, the DU may indicate to the CU-CP that the DL scheduling for the UE is now possible by using the paging message or new message. The I-RNTI may be also sent to identify the UE in the CU-CP. Similarly, the DU UE F1AP ID may be allocated so as to uniquely identify the UE over the F1 interface within a DU.

In step S1116, on receiving the message from the DU, the last serving CU-CP may copy the buffered NAS PDU to prepare for the transmission failure for the NAS PDU.

In step S1118, the last serving CU-CP may send a request for small data delivery request. The request may be the F1AP small data delivery request message or new message including the NAS PDU. The DU UE F1AP ID and CU UE F1AP ID may be also included so as to uniquely identify the UE over the F1 interface within a DU and CU-CP, respectively.

In step S1120, according to the DL scheduling for the UE, the DU may send the downlink data to the UE.

In step S1122, if configured, the UE may send the UL feedback for acknowledgement over PUCCH or PRACH.

In step S1124, if ACK is received in step S1122, the DU may send a response message to CU-CP. The response message may be F1AP small data delivery response message or new message informing that NAS PDU transmission is successful.

If NACK is received in step S1122, the DU may indicate to the CU-CP that the NAS PDU transmission is failed. In this case, the CU-CP may trigger the NAS non delivery indication procedure to report the non-delivery of a NAS message.

In step S1126, when the small data delivery response message or new message is received from the DU, the CU-CP may delete the copies of the buffered NAS PDU.

According to embodiments of the present disclosure, the CU-CP may quickly deliver the NAS PDU to the UE. Therefore, the UE's experience may be improved with the unnecessary latency due to the data retransmission can be reduced. The RAN paging procedure may be more stabilized.

Figure 12:
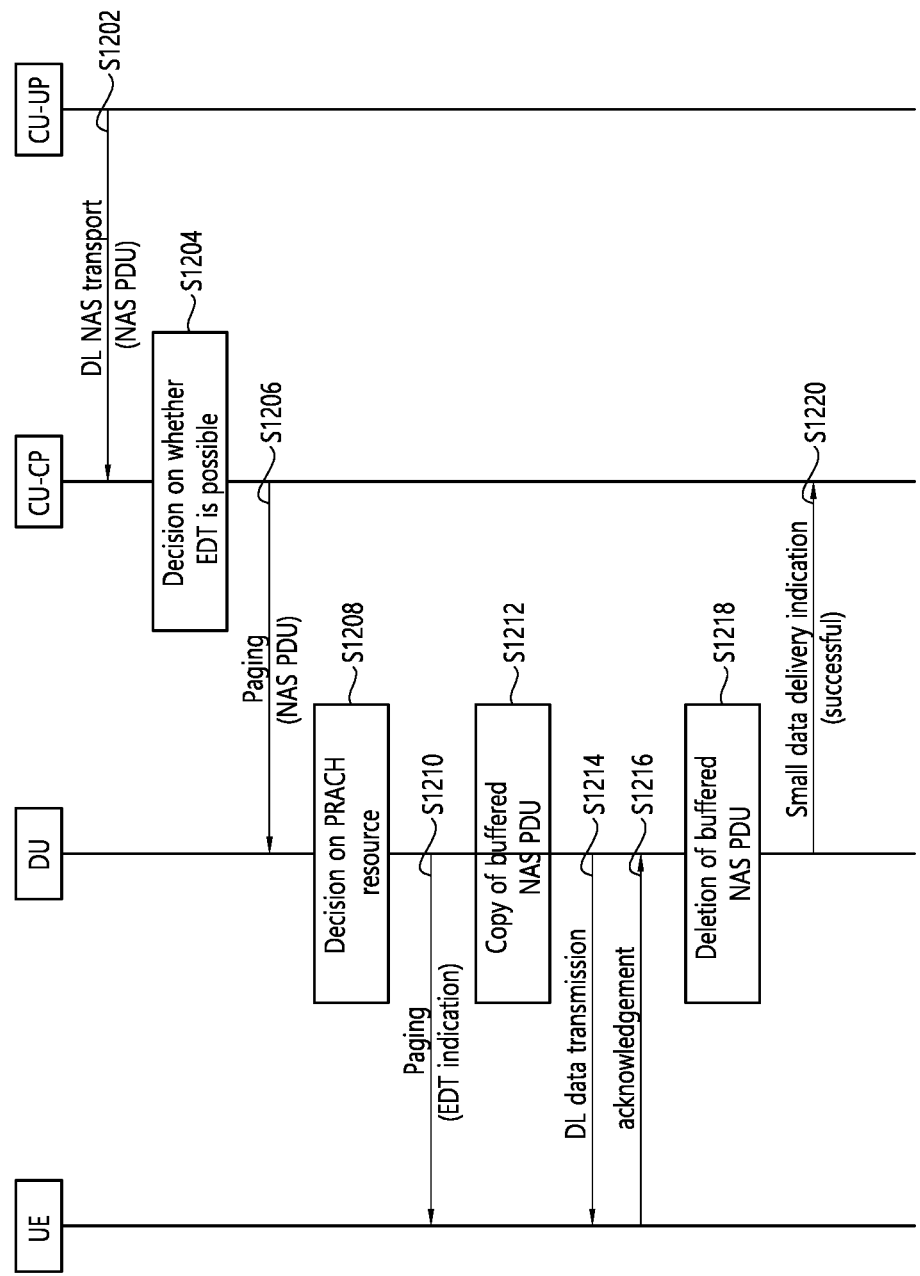
FIG. 12 shows a method for performing EDT according to an embodiment of the present disclosure.

FIG. 12 shows a method for performing early data transmission (EDT) according to an embodiment of the present disclosure. In this embodiment, the procedure for EDT with MT data via control plane in CU-DU split (DU buffering) may be provided.

In this embodiment, the buffering of the NAS PDU in the CU-CP may be introduced. In this case, the CU-CP may indicate to the DU that the paging for MT EDT is needed. When the DU is aware of the access of the UE, the DU may report to the CU-CP. Then, the CU-CP may forward the NAS PDU to the UE via the DU.

In this embodiment, a UE may be not only a terminal device, but also any types of device operating as wireless device, for example, an integrated access backhaul (IAB) node. Therefore, a UE may be referred as a wireless device.

As an initial condition, the UE may be in RRC-INACTIVE state. The UE and last serving gNB-CU may store the UE context. The NG-C connection between last serving gNB-CU-CP and AMF may be maintained. In addition, the NG-U connection between last serving gNB-CU-UP and UPF may be maintained. The F1 connection between last serving gNB-CU and gNB-DU may be disconnected.

In step S1202, on arrival of the downlink data packet, the AMF may send the NGAP downlink NAS transport message including the NAS PDU to the CU-CP.

In step S1204, the CU-CP may decide whether the RRC state transition is needed or not. That is, the CU-CP may determine whether EDT is possible or not. The decision on whether EDT is possible may depend on at least one of based on the expected UE behavior, the downlink data size received in step S1202, and so on. When no further subsequent data are expected, the CU-CP may decide to keep the UE in RRC_INACTIVE state. If not, the CU-CP may decide to move the UE in RRC_CONNECTED state for potential subsequent UL or DL.

In addition, the CU-CP may check the downlink data size compared to the TB size. For the case where the downlink data size is less than or equal to a TB size, the EDT for the DL data may be used. If not, the CU-CP may move the UE in RRC_CONNECTED state to send the downlink data to the UE.

In step S1206, when the CU-CP decides to keep the UE in RRC_INACTIVE state and the EDT for the DL data is possible, the CU-CP may send paging message to the DU. The paging message may be F1AP paging message or new message including the NAS PDU, which indicates to the DU that the NAS PDU should be transmitted by the EDT.

In step S1208, on receiving the message from the last serving CU-CP, the DU may decide the PRACH resource for the EDT.

In step S1210, the DU may send the paging message including the EDT indication to the UE. This message may also contain additional information (e.g., RNTI, Contention-free PRACH, DL grant), which is used for the UE to monitor (N)PDCCH after paging message for DL data scheduling.

In step S1212, the DU may copy the buffered NAS PDU to prepare for the transmission failure for the NAS PDU.

In step S1214, according to the DL scheduling for the UE, the DU may send the downlink data to the UE.

In step S1216, on receiving the message from the DU, the last serving CU-CP may copy the buffered NAS PDU to prepare for the transmission failure for the NAS PDU.

In step S1218, when the ACK is received from the UE, the DU may delete the copies of the buffered NAS PDU.

In step S1220, if ACK is received in step S1216, the DU may send a message indicating a small data delivery indication to CU-CP. The message may be F1AP small data delivery indication message or new message indicating that NAS PDU transmission is successful.

If NACK is received in step S1216, the DU may indicate to the CU-CP that the NAS PDU transmission is failed. In this case, the DU also may forward the NAS PDU to the CU-CP. Then, the CU-CP may trigger the NAS non delivery indication procedure to report the non-delivery of a NAS message.

According to embodiments of the present disclosure, the CU-CP may quickly deliver the NAS PDU to the UE. Therefore, the UE's experience may be improved with the unnecessary latency due to the data retransmission can be reduced. The buffered NAS PDU may be more quickly transmitted to the UE since the NAS PDU is already forwarded into the DU.

Figure 13:
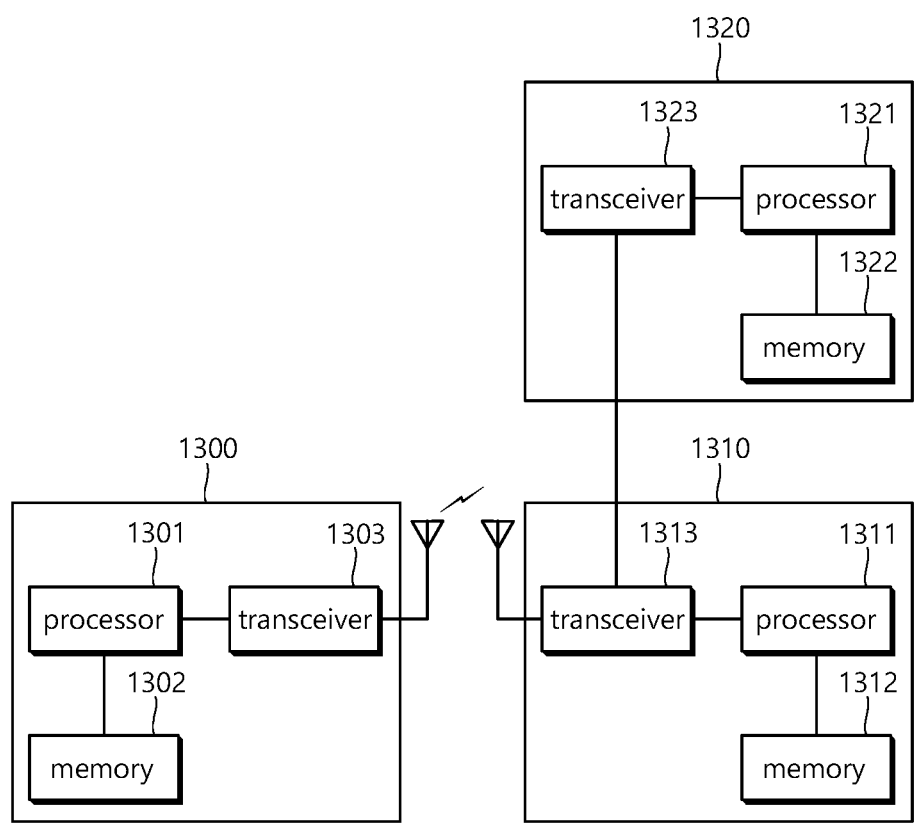
FIG. 13 shows more detailed wireless apparatus to implement an embodiment of the present disclosure.

FIG. 13 is a block diagram illustrating a wireless apparatus in which an embodiment of the present disclosure can be implemented.

A wireless device 1300 includes a processor 1301, a memory 1302, and a transceiver 1303. The memory 1302 is coupled to the processor 1301, and stores a variety of information for driving the processor 1301. The transceiver 1303 is coupled to the processor 1301, and transmits and/or receives a radio signal. The processor 1301 implements the proposed functions, procedures, and/or methods. In the aforementioned embodiments, an operation of the wireless device 1300 may be implemented by the processor 1301.

A distributed unit (DU) 1310 includes a processor 1311, a memory 1312, and a transceiver 1313. The memory 1312 is coupled to the processor 1311, and stores a variety of information for driving the processor 1311. The transceiver 1313 is coupled to the processor 1311, and transmits and/or receives a radio signal. The processor 1311 implements the proposed functions, procedures, and/or methods. In the aforementioned embodiments, an operation of the wireless device 1310 may be implemented by the processor 1311.

The central unit (CU) 1320 includes a processor 1321, a memory 1322 and a transceiver 1323. The memory 1322 is coupled to the processor 1321 to store various information for driving the processor 1321. Transceiver 1323 is coupled to processor 1321 to transmit and/or receive wireless signals. Processor 1321 implements the proposed functionality, process and/or method. In the above-described embodiment, the operation of the CU can be implemented by the processor 1321.

The processors may include application-specific integrated circuit (ASIC), other chipset, logic circuit and/or data processing device. The memories may include read-only memory (ROM), random access memory (RAM), flash memory, memory card, storage medium and/or other storage device. The transceivers may include baseband circuitry to process radio frequency signals. When the embodiments are implemented in software, the techniques described herein can be implemented with modules (e.g., procedures, functions, and so on) that perform the functions described herein. The modules can be stored in memories and executed by processors. The memories can be implemented within the processors or external to the processors in which case those can be communicatively coupled to the processors via various means as is known in the art.

According to an embodiment of the present disclosure, the processor 1310 may be configured to transmit a radio resource control (RRC) connection resume request message to a control plane (CP) of central unit (CU) of the network node.

The processor 1310 may be configured to receive information informing that downlink (DL) data exists from the CP. The information may be received via RRC message. The RRC message may inform to release the transmission resources. The information may inform the DU of waiting for releasing the transmission resources until reception of the DL data The processor 1310 may be configured to receive DL data from a user plane (UP) of the CU.

The processor 1310 may be configured to transmit the DL data to a wireless device in response to the information, upon receiving the DL data. The transmitting the DL data may include multiplexing the DL data with the RRC message.

The processor 1310 may be configured to release transmission resources after transmitting the DL data.

Further, the processor 1310 may be configured to transmit uplink (UL) data to the UP, when it is determined to perform early data transmission (EDT) by the CP based on the RRC connection resume request message. The UL link data may be forwarded to a core network upon successful resume of a bearer context of the wireless device.

According to embodiments of the present disclosure, unnecessary signals between DU and CU during the EDT may be removed. In specific, the CU-CP may efficiently control whether the DU forwards the RRC message to the UE immediately, and whether the bearer context in the CU-UP should be fully resumed or not. Therefore, the performance of the UE may be better since the loss of DL data can be avoided and the unnecessary latency due to the data retransmission can be reduced.

The embodiments of the disclosure may be applied to various future technologies, such as AI, robots, autonomous-driving/self-driving vehicles, and/or extended reality (XR).

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

A robot can mean a machine that automatically processes or operates a given task by its own abilities. In particular, a robot having a function of recognizing the environment and performing self-determination and operation can be referred to as an intelligent robot. Robots can be classified into industrial, medical, household, military, etc., depending on the purpose and field of use. The robot may include a driving unit including an actuator and/or a motor to perform various physical operations such as moving a robot joint. In addition, the movable robot may include a wheel, a break, a propeller, etc., in a driving unit, and can travel on the ground or fly in the air through the driving unit.

The autonomous-driving refers to a technique of self-driving, and an autonomous vehicle refers to a vehicle that travels without a user's operation or with a minimum operation of a user. For example, autonomous-driving may include techniques for maintaining a lane while driving, techniques for automatically controlling speed such as adaptive cruise control, techniques for automatically traveling along a predetermined route, and techniques for traveling by setting a route automatically when a destination is set. The autonomous vehicle may include a vehicle having only an internal combustion engine, a hybrid vehicle having an internal combustion engine and an electric motor together, and an electric vehicle having only an electric motor, and may include not only an automobile but also a train, a motorcycle, etc. The autonomous vehicle can be regarded as a robot having an autonomous driving function.

XR are collectively referred to as VR, AR, and MR. VR technology provides real-world objects and/or backgrounds only as computer graphic (CG) images, AR technology provides CG images that is virtually created on real object images, and MR technology is a computer graphics technology that mixes and combines virtual objects in the real world. MR technology is similar to AR technology in that it shows real and virtual objects together. However, in the AR technology, the virtual object is used as a complement to the real object, whereas in the MR technology, the virtual object and the real object are used in an equal manner. XR technology can be applied to HMD, head-up display (HUD), mobile phone, tablet PC, laptop, desktop, TV, digital signage. A device to which the XR technology is applied may be referred to as an XR device.

Figure 14:
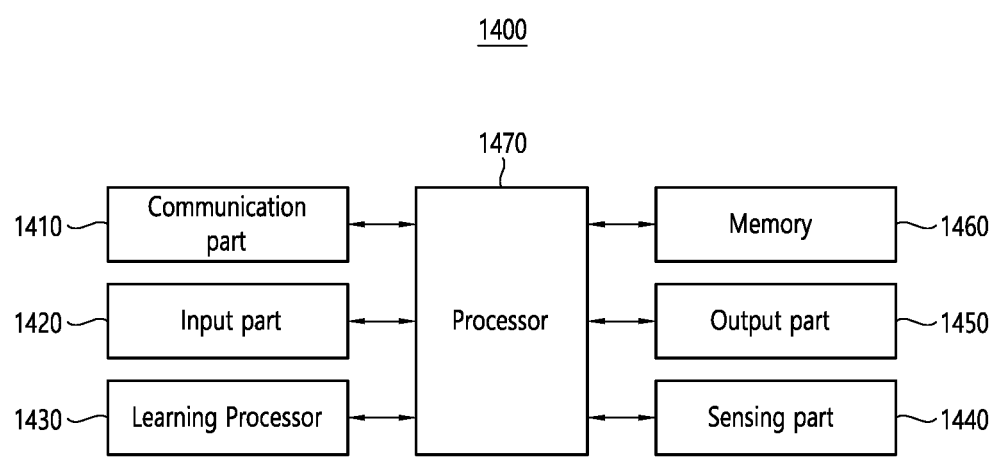
FIG. 14 shows an example of an AI device to which the technical features of the present disclosure can be applied.

FIG. 14 shows an example of an AI device to which the technical features of the disclosure can be applied.

The AI device 1400 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 14, the AI device 1400 may include a communication part 1410, an input part 1420, a learning processor 1430, a sensing part 1440, an output part 1450, a memory 1460, and a processor 1470.

The communication part 1410 can transmit and/or receive data to and/or from external devices such as the AI devices and the AI server using wire and/or wireless communication technology. For example, the communication part 1410 can transmit and/or receive sensor information, a user input, a learning model, and a control signal with external devices. The communication technology used by the communication part 1410 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1420 can acquire various kinds of data. The input part 1420 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1420 can acquire input data to be used when acquiring an output using learning data and a learning model for model learning. The input part 1420 may obtain raw input data, in which case the processor 1470 or the learning processor 1430 may extract input features by preprocessing the input data.

The learning processor 1430 may learn a model composed of an ANN using learning data. The learned ANN can be referred to as a learning model. The learning model can be used to infer result values for new input data rather than learning data, and the inferred values can be used as a basis for determining which actions to perform. The learning processor 1430 may perform AI processing together with the learning processor of the AI server. The learning processor 1430 may include a memory integrated and/or implemented in the AI device 1400. Alternatively, the learning processor 1430 may be implemented using the memory 1460, an external memory directly coupled to the AI device 1400, and/or a memory maintained in an external device.

The sensing part 1440 may acquire at least one of internal information of the AI device 1400, environment information of the AI device 1400, and/or the user information using various sensors. The sensors included in the sensing part 1440 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1450 may generate an output related to visual, auditory, tactile, etc. The output part 1450 may include a display unit for outputting visual information, a speaker for outputting auditory information, and/or a haptic module for outputting tactile information.

The memory 1460 may store data that supports various functions of the AI device 1400. For example, the memory 1460 may store input data acquired by the input part 1420, learning data, a learning model, a learning history, etc.

The processor 1470 may determine at least one executable operation of the AI device 1400 based on information determined and/or generated using a data analysis algorithm and/or a machine learning algorithm. The processor 1470 may then control the components of the AI device 1400 to perform the determined operation. The processor 1470 may request, retrieve, receive, and/or utilize data in the learning processor 1430 and/or the memory 1460, and may control the components of the AI device 1400 to execute the predicted operation and/or the operation determined to be desirable among the at least one executable operation. The processor 1470 may generate a control signal for controlling the external device, and may transmit the generated control signal to the external device, when the external device needs to be linked to perform the determined operation. The processor 1470 may obtain the intention information for the user input and determine the user's requirements based on the obtained intention information. The processor 1470 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1430 and/or learned by the learning processor of the AI server, and/or learned by their distributed processing. The processor 1470 may collect history information including the operation contents of the AI device 1400 and/or the user's feedback on the operation, etc. The processor 1470 may store the collected history information in the memory 1460 and/or the learning processor 1430, and/or transmit to an external device such as the AI server. The collected history information can be used to update the learning model. The processor 1470 may control at least some of the components of AI device 1400 to drive an application program stored in memory 1460. Furthermore, the processor 1470 may operate two or more of the components included in the AI device 1400 in combination with each other for driving the application program.

Figure 15:
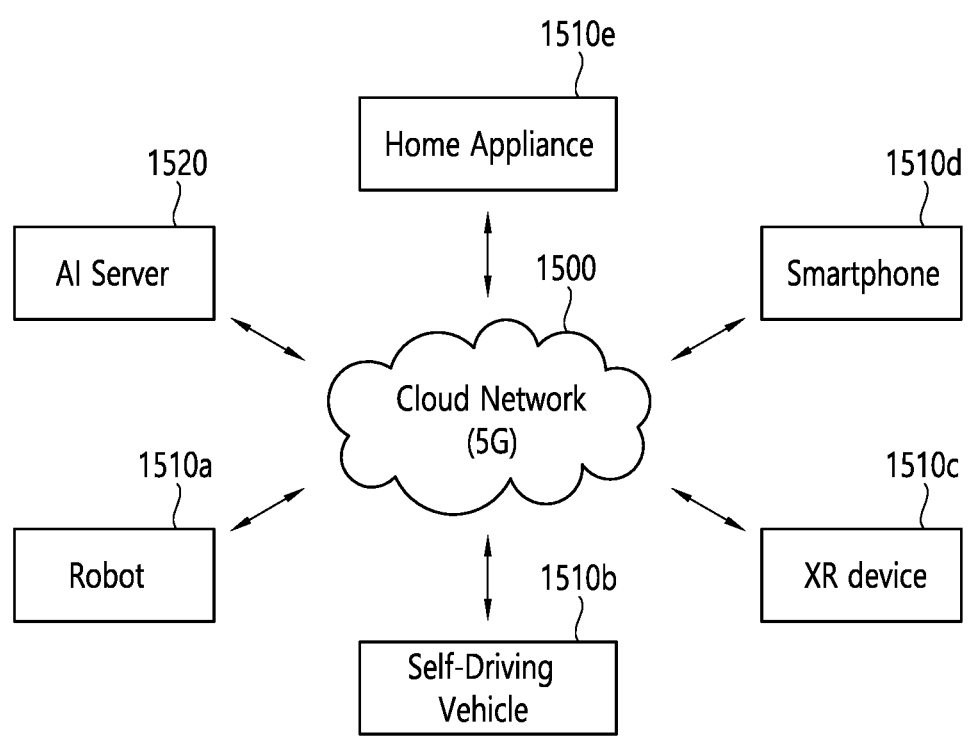
FIG. 15 shows an example of an AI system to which the technical features of the present disclosure can be applied.

FIG. 15 shows an example of an AI system to which the technical features of the present disclosure can be applied.

Referring to FIG. 15, in the AI system, at least one of an AI server 1520, a robot 1510a, an autonomous vehicle 1510b, an XR device 1510c, a smartphone 1510d and/or a home appliance 1510e is connected to a cloud network 1500. The robot 1510a, the autonomous vehicle 1510b, the XR device 1510c, the smartphone 1510d, and/or the home appliance 1510e to which the AI technology is applied may be referred to as AI devices 1510a to 1510e.

The cloud network 1500 may refer to a network that forms part of a cloud computing infrastructure and/or resides in a cloud computing infrastructure. The cloud network 1500 may be configured using a 3G network, a 4G or LTE network, and/or a 5G network. That is, each of the devices 1510a to 1510e and 1520 consisting the AI system may be connected to each other through the cloud network 1500. In particular, each of the devices 1510a to 1510e and 1520 may communicate with each other through a base station, but may directly communicate with each other without using a base station.

The AI server 1520 may include a server for performing AI processing and a server for performing operations on big data. The AI server 1520 is connected to at least one or more of AI devices constituting the AI system, i.e. the robot 1510a, the autonomous vehicle 1510b, the XR device 1510c, the smartphone 1510d and/or the home appliance 1510e through the cloud network 1500, and may assist at least some AI processing of the connected AI devices 1510a to 1510e. The AI server 1520 can learn the ANN according to the machine learning algorithm on behalf of the AI devices 1510a to 1510e, and can directly store the learning models and/or transmit them to the AI devices 1510a to 1510e. The AI server 1520 may receive the input data from the AI devices 1510a to 1510e, infer the result value with respect to the received input data using the learning model, generate a response and/or a control command based on the inferred result value, and transmit the generated data to the AI devices 1510a to 1510e. Alternatively, the AI devices 1510a to 1510e may directly infer a result value for the input data using a learning model, and generate a response and/or a control command based on the inferred result value.

Various embodiments of the AI devices 1510a to 1510e to which the technical features of the present disclosure can be applied will be described. The AI devices 1510a to 1510e shown in FIG. 15 can be seen as specific embodiments of the AI device 1400 shown in FIG. 14.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a distributed unit (DU) of a network node adapted to operate in a wireless communication system, the method comprising:

transmitting a radio resource control (RRC) resume request message to a central unit (CU) control plane (CP) of the network node;

upon a determination by the CU-CP to perform early data transmission (EDT) based on the RRC resume request message, transmitting uplink (UL) data to a CU-user plane (UP) of the network node;

receiving information informing that downlink (DL) data exists from the CU-CP;

receiving the DL data from the CU-UP;

transmitting the DL data to a wireless device in response to the information, upon receiving the DL data; and releasing transmission resources after transmitting the DL data, wherein the DU is a logical node hosting radio link control (RLC), media access control (MAC) and physical layers of the network node, wherein the CU-CP is a logical node hosting radio resource control (RRC) and a control plane part of a packet data convergence protocol (PDCP) of the network node, and wherein the CU-UP is a logical node hosting a user plane part of the PDCP of the network node.

2. The method of claim 1, wherein the information is received with an RRC message.

3. The method of claim 2, wherein the RRC message informs to release the transmission resources.

4. The method of claim 2, wherein the transmitting the DL data includes multiplexing the DL data with the RRC message.

5. The method of claim 1, wherein the information informs the DU of waiting for releasing the transmission resources until reception of the DL data.

6. The method of claim 1, wherein the UL data is forwarded to a core network upon successful resume of a bearer context of the wireless device.

7. The method of claim 1, wherein the wireless device communicates with at least one of a mobile terminal, a network or autonomous vehicles other than the wireless device.

8. A distributed unit (DU) of a network node adapted to operate in a wireless communication system, the DU comprising:

a memory;

a transceiver; and a processor, operably coupled to the memory and the transceiver, and configured to:

control the transceiver to transmit a radio resource control (RRC) resume request message to a CU) control plane (CP) of the network node;

upon a determination by the CU-CP to perform early data transmission (EDT) based on the RRC resume request message, control the transceiver to transmit uplink (UL) data to a CU-user plane (UP) of the network node;

control the transceiver to receive information informing that downlink (DL) data exists from the CU-CP;

control the transceiver to receive the DL data from the CU-UP;

control the transceiver to transmit the DL data to a wireless device in response to the information, upon receiving the DL data; and release transmission resources after transmitting the DL data, wherein the DU is a logical node hosting radio link control (RLC), media access control (MAC) and physical layers of the network node, wherein the CU-CP is a logical node hosting radio resource control (RRC) and a control plane part of a packet data convergence protocol (PDCP) of the network node, and wherein the CU-UP is a logical node hosting a user plane part of the PDCP of the network node.

9. The DU of claim 8, wherein the information is received with an RRC message.

10. The DU of claim 9, wherein the RRC message informs to release the transmission resources.

11. The DU of claim 9, wherein the transmitting the DL data includes multiplexing the DL data with the RRC message.

12. The DU of claim 8, wherein the information informs the DU of waiting for releasing the transmission resources until reception of the DL data.

13. The DU of claim 8, wherein the UL data is forwarded to a core network upon successful resume of a bearer context of the wireless device.

* * * * *